(12) United States Patent
Balde et al.

(10) Patent No.: US 12,477,078 B2
(45) Date of Patent: *Nov. 18, 2025

(54) VIDEO CALLING EXPERIENCE FOR MULTIPLE SUBJECTS ON A DEVICE

(71) Applicant: QUALCOMM Incorporated, San Diego, CA (US)

(72) Inventors: Ansh Abhay Balde, Hyderabad (IN); Santosh Anand, Secunderabad (IN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,925

(22) Filed: May 7, 2024

(65) Prior Publication Data
US 2024/0291932 A1    Aug. 29, 2024

Related U.S. Application Data

(63) Continuation of application No. 17/686,805, filed on Mar. 4, 2022, now Pat. No. 12,022,225.

(51) Int. Cl.
H04N 5/265    (2006.01)
H04L 65/1066    (2022.01)
H04N 5/262    (2006.01)
H04N 23/611    (2023.01)
H04N 23/63    (2023.01)
H04N 23/90    (2023.01)

(52) U.S. Cl.
CPC ......... *H04N 5/265* (2013.01); *H04L 65/1066* (2013.01); *H04N 5/2625* (2013.01); *H04N 23/611* (2023.01); *H04N 23/632* (2023.01); *H04N 23/90* (2023.01)

(58) Field of Classification Search
CPC ...... H04N 5/265; H04N 23/90; H04N 23/632; H04N 23/611; H04N 5/2625; H04L 65/1066

See application file for complete search history.

(56) References Cited

U.S. PATENT DOCUMENTS 8,866,943 B2    10/2014    Park et al.
9,621,818 B2 *    4/2017    Jung ................. H04N 5/272
9,762,729 B1    9/2017    Sales et al.
10,965,909 B2 *    3/2021    Tanaka ............. H04M 3/563
11,165,992 B1    11/2021    Ong et al.

(Continued)

OTHER PUBLICATIONS

International Search Report and Written Opinion—PCT/US2023/060046—ISA/EPO—May 8, 2023.

*Primary Examiner* — Olisa Anwah
(74) *Attorney, Agent, or Firm* — Polsinelli LLP

(57) ABSTRACT

Systems, methods, and computer-readable media are provided for video calling. An example method can include establishing a video call between a first device and a second device; displaying a preview of a first camera feed and a second camera feed, the first camera feed including a first video frame captured by a first image capture device of the first device and a second video frame captured by a second image capture device of the first device, the first video frame and the second video frame being visually separated within the preview; receiving a selection of a set of subjects depicted in the preview; and generating, based on the first camera feed and the second camera feed, a single frame depicting the set of subjects.

20 Claims, 10 Drawing Sheets

(56) References Cited

U.S. PATENT DOCUMENTS

| | | | |
|---|---|---|---|
| 11,792,355 B1* | 10/2023 | Libin | G06F 3/011 |
| | | | 348/36 |
| 2013/0300819 A1 | 11/2013 | Halavy | |
| 2014/0253669 A1* | 9/2014 | Kim | H04N 21/4788 |
| | | | 348/14.07 |
| 2015/0022617 A1* | 1/2015 | Le | G06F 3/017 |
| | | | 348/14.02 |
| 2016/0269684 A1 | 9/2016 | Lim et al. | |
| 2016/0359941 A1 | 12/2016 | Kvaal et al. | |
| 2017/0099459 A1* | 4/2017 | Nimri | G10L 25/72 |
| 2019/0222892 A1* | 7/2019 | Faulkner | H04N 21/4314 |
| 2020/0344278 A1 | 10/2020 | Mackell et al. | |
| 2022/0329883 A1 | 10/2022 | Stokking | |
| 2023/0275940 A1* | 8/2023 | Agrawal | H04N 23/45 |
| | | | 348/14.02 |
| 2023/0283741 A1 | 9/2023 | Balde et al. | |
| 2023/0403367 A1* | 12/2023 | Hassan | G06F 3/04845 |

* cited by examiner

VIDEO CALLING EXPERIENCE FOR MULTIPLE SUBJECTS ON A DEVICE

CROSS-REFERENCE TO RELATED APPLICATIONS

This application is a continuation of U.S. non-provisional application Ser. No. 17/686,805, filed Mar. 4, 2022, which is hereby incorporated by reference in its entirety and for all purposes.

TECHNICAL FIELD

The present disclosure generally relates to video calling systems. For example, aspects of the present disclosure relate to video calling experiences for multiple subjects on one device.

BACKGROUND

Phone systems have become a ubiquitous tool for remote users to communicate. Today, phone systems typically support a number of common features such as voice communications, video communications, call waiting, call hold, and conferencing, among others. Generally, the performance quality of a video call can depend on the quality of the network connection used to establish and conduct the video call. However, even with faster and more reliable communication protocols and technologies becoming increasingly more common and available, network issues remain prevalent. For example, the stability/continuity of video calls is often hampered by network issues. The network issues can result in frames dropped during the call (e.g., a call between two users, a conference call, etc.), which can disrupt the call and force users in the call to wait for the issues to resolve in order to continue the call.

In addition to connection/network issues, the placement of a camera used during a video call can cause issues such as, for example, a participant of the call being outside of the field-of-view (FOV) of the camera and thus excluded from the video frames captured by the camera, which prevents users on the other end of the call from seeing that call participant. As another example, depending on the placement of the camera, the camera may capture other users or distractions that are unintentionally captured and included in the video frames transmitted during the call.

BRIEF SUMMARY

Disclosed are systems, methods, and computer-readable media for video calling experiences for multiple subjects on a device. According to at least one example, a method is provided for a video calling experience for multiple subjects on a device. The method can include establishing a video call between a device and a remote device; displaying a preview of a first camera feed and a second camera feed, the first camera feed including a first video frame captured by a first image capture device of the device and a second video frame captured by a second image capture device of the device, the first video frame and the second video frame being visually separated within the preview; receiving a selection of a set of subjects depicted in the preview; and generating, based on the first camera feed and the second camera feed, a single frame depicting the set of subjects.

According to at least one example, an apparatus is provided for a video calling experience for multiple subjects on the apparatus. The apparatus can include memory and one or more processors coupled to the memory, the one or more processors being configured to: establish a video call between a device and a remote device; display a preview of a first camera feed and a second camera feed, the first camera feed including a first video frame captured by a first image capture device of the device and a second video frame captured by a second image capture device of the device, the first video frame and the second video frame being visually separated within the preview; receive a selection of a set of subjects depicted in the preview; and generate, based on the first camera feed and the second camera feed, a single frame depicting the set of subjects.

According to at least one example, another apparatus is provided for a video calling experience for multiple subjects on the apparatus. The apparatus can means for establishing a video call between a device and a remote device; displaying a preview of a first camera feed and a second camera feed, the first camera feed including a first video frame captured by a first image capture device of the device and a second video frame captured by a second image capture device of the device, the first video frame and the second video frame being visually separated within the preview; receiving a selection of a set of subjects depicted in the preview; and generating, based on the first camera feed and the second camera feed, a single frame depicting the set of subjects.

According to at least one example, an non-transitory computer-readable medium is provided for a video calling experience for multiple subjects on the apparatus. The non-transitory computer-readable medium can include instructions which, when executed by one or more processors, cause the one or more processors to: establish a video call between a device and a remote device; display a preview of a first camera feed and a second camera feed, the first camera feed including a first video frame captured by a first image capture device of the device and a second video frame captured by a second image capture device of the device, the first video frame and the second video frame being visually separated within the preview; receive a selection of a set of subjects depicted in the preview; and generate, based on the first camera feed and the second camera feed, a single frame depicting the set of subjects.

In some aspects, the method, non-transitory computer-readable medium, and apparatuses described above can obtain the first video frame from the first image capture device and the second video frame from the second image capture device.

In some examples, the first video frame and the second video frame depict a plurality of subjects including the set of subjects, and the selection of the set of subjects can include a first input selecting the set of subjects as a subset of the plurality of subjects to be included in the single frame and/or a second input selecting one or more subjects of the plurality of subjects to be excluded from the single frame. In some examples, the one or more subjects can be different than the set of subjects.

In some examples, generating the single frame can include based on the first input and/or the second input, excluding, from the single frame, the one or more subjects of the plurality of subjects; and sending the single frame to the remote device. In some examples, excluding the one or more subjects from the single frame can include removing the one or more subjects from the preview, the first video frame, the second video frame, and/or the single frame.

In some aspects, generating the single frame can include combining at least a portion of the first video frame and at least a portion of the second video frame into the single frame. In some examples, combining at least a portion of the first video frame and at least a portion of the second video frame into the single frame can include arranging at least the portion of the first video frame and at least the portion of the second video frame into respective frame regions of the single frame. In some examples, each frame region can depict a respective subject from the set of subjects.

In some examples, the first video frame can include one or more first subjects from the set of subjects and the second video frame can include one or more second subjects from the set of subjects. In some aspects, generating the single frame can include determining, based on first metadata associated with the first video frame, a respective location of each of the one or more first subjects within the first video frame; determining, based on second metadata associated with the second video frame, a respective location of each of the one or more second subjects within the second video frame; and based on the respective location of each of the one or more first subjects within the first video frame and the respective location of each of the one or more second subjects within the second video frame, determining a first portion of the first video frame depicting the one or more first subjects and a second portion of the second video frame depicting the one or more second subjects. In some examples, the first metadata can include coordinates associated with the one or more first subjects. In some examples, the second metadata can include coordinates associated with the one or more second subjects.

In some examples, generating the single frame can include combining the first portion of the first video frame and the second portion of the second video frame into the single frame. In some cases, combining the first portion of the first video frame and the second portion of the second video frame into the single frame can include placing the first portion of the first video frame and the second portion of the second video frame within respective frame regions of the single frame. In some examples, a first region of the respective frame regions depicts the one or more first subjects and a second region of the respective frame regions depicts the one or more second subjects.

In some examples, generating the single frame can include rendering at least a portion of the first video frame and at least a portion of the second video frame within the single frame. In some cases, the at least the portion of the first video frame and the at least the portion of the second video frame are visually separated. In some cases, the at least the portion of the first video frame and the at least the portion of the second video frame are visually separated by a visual marker. In some examples, the visual marker can include a line, an outline, a box, a highlight, a label, color, shading, and/or a visual indicia.

In some aspects, the method, non-transitory computer-readable medium, and apparatuses described above can determine that one or more subjects are within a field-of-view (FOV) of the first image capture device; and trigger the first image capture device to capture the first video frame. In some examples, the first video frame depicts the one or more subjects.

In some aspects, the method, non-transitory computer-readable medium, and apparatuses described above can track the one or more subjects based on one or more video frames captured by the first image capture device; based on the tracking, determine that the one or more subjects are no longer within the FOV of the first image capture device; and based on the determining that the one or more subjects are no longer within the FOV of the first image capture device, determine to stop transmitting video data from the first image capture device to the remote device.

In some aspects, the method, non-transitory computer-readable medium, and apparatuses described above can, in response to determining that at least one subject is within a FOV of the second image capture device, obtain, via the second image capture device, a third video frame depicting the at least one subject; and send the third video frame to the remote device.

In some aspects, the apparatuses described above can include one or more sensors. In some examples, the apparatuses described above can include a mobile phone, a conference system, a telephone system, a wearable device, a display device, a mobile computer, a head-mounted display, and/or a camera.

In some aspects, one or more of the apparatuses described above is, can be part of, or can include an Internet-of-Things (IoT) device and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. For instance, the one or more sensors can include at least one of a light sensor, an audio sensor, a motion sensor, a temperature sensor, a humidity sensor, an image sensor, an accelerometer, a gyroscope, a pressure sensor, a touch sensor, and a magnetometer. In some cases, the one or more sensors can be used for determining a location of the apparatuses, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1A:
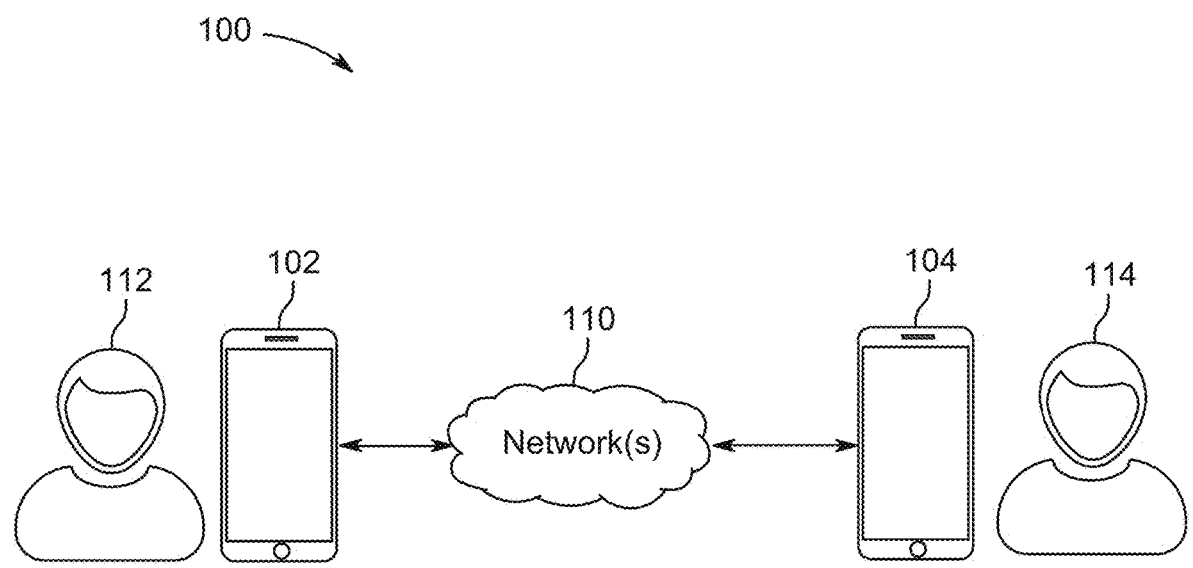
FIG. 1A is a diagram illustrating an example video call between users, in accordance with some examples of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

As previously explained, the quality, reliability, performance, etc., of video calls can be negatively affected by a number of things such as network issues, camera placement, camera capabilities, etc. In one illustrative example, during a video call between user A and user B, user C walks into user B's room/space and wants to be a part of a video call conversation between user A and user B. In this example, user B then needs to accommodate user C by ensuring that user C is within a field-of-view (FOV) of a particular camera (e.g., a front-facing camera) on user B's device, so that both user B and user C can be captured by the recorded video from the camera of user B's device. Alternatively, user B can turn on (e.g., activate and/or utilize for purposes of capture, recording, and/or transmission) or transition to an additional camera (e.g., a back-facing camera) of user B's device, in which case only user C may be part of the video and seen by user A on the other end of the video call. This can be detrimental to user A's video call experience, as user A is not able to have an intended conversation with both user B and user C such that both user B and user C are visible to user A at the same time (e.g., within the same video frames or concurrently displayed video frames during the video call).

As another example, if during a video call between user A and user B, user A wants to move around while user A's device is kept at a static position, user A may no longer be within the FOV of a particular camera on user A's device. Thus, user A will not be captured in the recorded video frames sent to user B, and user B will not be able see user A in the video from the call. As user A moves from a FOV of a first camera of user A's device (e.g., a FOV of a front-facing camera) to a FOV of a second camera (e.g., a FOV of a back-facing camera of user A's device), user A needs to manually switch the camera to the second camera for the video call so that user A is captured by the video frames from the second camera. Alternatively, user A can return to the area within the first camera's FOV to be captured by the recorded video frames from the first camera on user A's device. If, for example, user A moves entirely out of the FOVs of all cameras (e.g., the front and back cameras) on user A's device but wants to continue the conversation (e.g., using a headset), user A will be able to continue the audio conversation but will not be captured in the video frames recorded by user A's device and thus will not be visible to any users (e.g., user B) on the other end of the video call.

Systems, apparatuses, processes (also referred to as methods), and computer-readable media (collectively referred to herein as "systems and techniques") are described herein for improved video calling experiences for multiple subjects participating in the video call using the same device. In some examples, the systems and techniques described herein can turn on (and/or maintain on) multiple cameras (e.g., front and back cameras) of the device shared by multiple users during a video call to allow the cameras (e.g., the front and back cameras) to capture both users on the video call from the same device. In some examples, the device can track any of the users and make any adjustments to ensure both users are captured by the recorded video frames even if one or more of the users moves during the video call.

In some examples, the systems and techniques described herein can use a lower-power facial tracking mode (e.g., relative to a higher-power facial tracking mode available at the device which uses higher-power resources and/or implements higher power/complexity software components) to track users during a video call. To illustrate, in the previous example where user C walks into user B's room/space during a video call and wants to participate in the video call, the system can capture frames of both user B and user C, merge or combine the frames depicting user B and user C into a single frame, and send the single frame to user A's device on the other end of the video call. For example, the system can arrange the frames of user B and user C so that one frame (e.g., the frame capturing user B) is above the other frame (e.g., the frame capturing user C). The system can then transmit the resulting frame to user A's device (e.g., as part of the video call). In some examples, the system can stitch the frames into a single frame to accommodate both the subjects (e.g., user B and user C) participating in the video call from the same device.

In some cases, if there are two subjects in the FOV of a first camera (e.g., a back-facing camera) of user B's device, the system can separate the frames from the first camera and send them as separate frames stitched together along with the frame capturing the subject within the FOV of a second camera (e.g., a front-facing camera) of user B's device. For example, if user C and user D move within the FOV of a first camera (e.g., a back-facing camera) of a device while user B is within the FOV of a second camera (e.g., a front-facing camera), user B would generally need to switch the video from the second camera to the first camera to show user C and user D. In this example scenario, if user C and user D are far apart (e.g., such that users C and D are not within the FOV of a particular camera), a number of facial features of user C and user D may not be captured and displayed in the video call. However, the system and techniques described herein can segregate the frames depicting user C and user D into separate characters as further described herein.

In some cases, a user using a device to participate in a video call can call (e.g., trigger, request, initiate, etc.) a camera-switching video call user interface (UI). Multiple cameras (e.g., front and back cameras) of the device may be turned on and can send captured frames to the device's processor (e.g., the digital signal processor, etc.), which may then be sent to a display for the sender to preview the frames (e.g., using the camera-switching call UI). In some examples, the device can send the feeds from both cameras in a segregated manner (e.g., segregated by a line, character, object, shape, etc.). The system can implement a frame segregator to segregate the captured users (or faces of the users) and show them on the preview UI.

In some examples, the sender (e.g., the user sending the video feed to the other user(s) on the video call) can provide user input to the system indicating a selection of which users or faces the sender wants to include in a given frame and/or wants to send a preview of on a particular side or region of the preview UI. In some cases, the system can output (e.g., display, play audio, or otherwise output) a permission message asking the sender to confirm the input users or faces. Image data corresponding to the selected users or faces can then be provided to the encoder to be encoded and transmitted to the receiver through the video calling pipeline. The receiver can receive the video frames which depict the sender as well as the additional users participating in the video call through the same device as the sender.

In some examples, the first camera (e.g., a front-facing camera) and second camera (e.g., a back-facing camera) feeds can be regulated using a regulator component. For instance, the regulator component can check for subjects' frames and reduce the encoder workload by sending the camera feed only when subjects are present. In some cases, a camera feed can include a timestamp, buffer information, and/or metadata. In some examples, the metadata can include facial coordinates and/or a facial coordinates metadata tag. The facial coordinates can be used to segregate faces in the video call. Before using the video feed, the system can call a user inputs pipeline to determine what faces the user wants to send from the user's available FOV on the cameras of the user's device. This information can be relayed to a regulator and frame segregator. The regulator can regulate the video call by eliminating the faces that the user does not want included in the call, and the frame segregator can restructure multiple frames into a single frame as per the number of faces being included. In some examples, two faces can be arranged or reordered within a single frame, three faces may be arranged so that one face is on a first region (e.g., a top region) and the other two faces are in one or more other regions (e.g., a bottom region or any other arrangement), and so on.

In some cases, the systems and techniques described herein can implement a subject tracking mode. For example, the system may send frames only when a user is present in the FOV of either/any camera of the user's device (e.g., a first camera such as a front-facing camera, a second camera such as a back-facing camera, etc.). This can involve subject tracking. As the system detects facial features, the camera can stop sending the frames from one camera (e.g., a first camera such as a front-facing camera) when users move within the FOV of another camera (e.g., a second camera such as a back-facing camera). The system can thus send frames captured from one camera when the user(s) is within the FOV of that camera and send frames captured by a different camera when the user(s) moves within the FOV of the different camera.

FIG. 1A illustrates an example video call 100 between users 112 and 114. The video call 100 can include and/or support one or more call features such as, for example, audio, video, call hold, call waiting, conferencing, interactive voice response (IVR), dual-tone multi-frequency signaling (DTMF), screen sharing, side chats, and/or any other call features.

User 112 can communicate with user 114 on the video call 100 via endpoint 102, and user 114 can communicate with user 112 via endpoint 104. Each of the endpoints 102 and 104 can include any computing device or phone system such as, for example, a smartphone, a smart wearable device (e.g., a smart watch, smart goggles), a smart television, a game system, a tablet computer, an IP (Internet Protocol) phone, a laptop computer, a car phone, a desk phone, an IoT (Internet-of-Things) device, etc.

The endpoints 102 and 104 can support video and voice/audio. In some cases, the endpoints 102 and 104 can also support other features such as, for example and without limitation, facial detection/recognition, object detection/recognition, tracking, DTMF, automatic speech processing (ASR), keyword detection, active speaker detection, and/or any other calling and/or image processing functionalities. In some examples, the endpoints 102 and 104 can support one or more other call and/or multimedia features such as, for example, call conferencing, call waiting, voicemail, and/or any other call or multimedia features.

The endpoints 102 and 104 can establish the video call 100 via network 110. Network 110 can represent one or more public and/or private networks. Network 110 can include, for example, a public switched telecommunications network (PTSN), a wireless network (e.g., a cellular network, a wireless local area network, a satellite communication network, a microwave network, etc.), an Internet Protocol (IP) network, a call provider network, a cloud network hosting call and/or conferencing services, an integrated services digital network (ISDN), a virtual network, a telephone operator network, a landline network, and/or any other type of network.

Figure 1B:
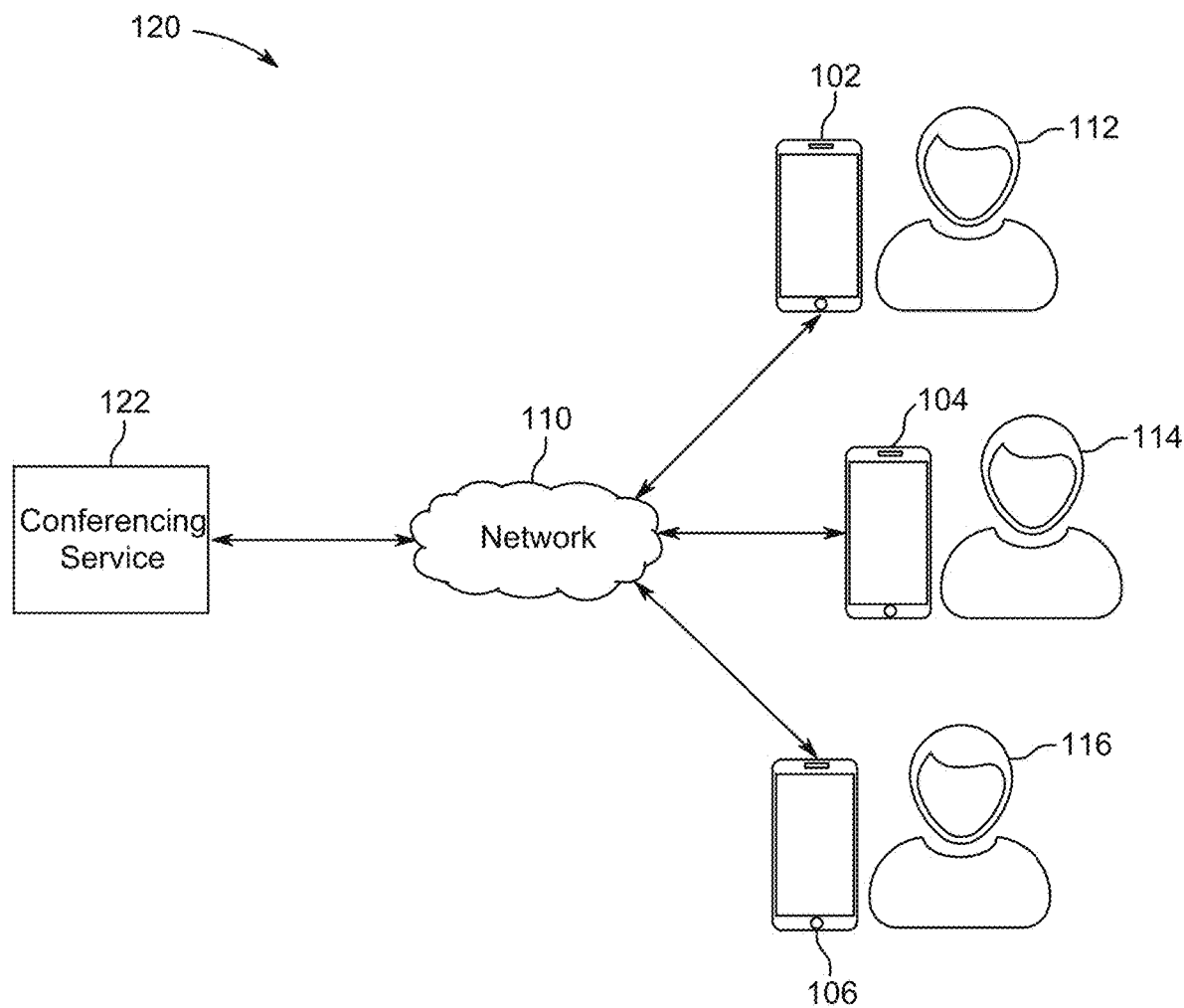
FIG. 1B is a diagram illustrating an example video conference between users, in accordance with some examples of the present disclosure.

FIG. 1B illustrates an example conference call 120 between users 112-116. The conference call 120 can include and/or support one or more call features such as, for example, audio, video, call hold, voice messaging, call waiting, IVR, DTMF, screen sharing, call recording, and/or any other call features described herein. In some examples, the conference call 120 can include and/or support other features such as, for example, content sharing, instant messaging, desktop or screen sharing, chat, presence sharing, object detection/recognition, facial detection/recognition, tracking, image processing, and/or other types of media and communications.

The users 112-116 can communicate with each other on the conference call 120 using their respective endpoints 102-106. Each of the endpoints 102-106 can include any computing device or phone system and can support a number of call features as previously described with respect to FIG. 1A. The endpoints 102-106 can connect to the conference call 120 via network 110. In some examples, the conference call 120 can be hosted and managed by a conferencing service 122.

The conferencing service 122 can manage various aspects of the conference call 120, such as content, communications, data, state, settings, functionality, routing, bridging, etc. In some examples, the conferencing service 122 can host concurrent conferences, persistent conferences, and any other types or combinations of conferences. The conferencing service 122 can host one or more conferences at any time or period (e.g., an hour, a day, a week, a month, etc.), with respective participants connecting via their endpoints from different geographic locations, networks, etc. In some cases, the number and/or type of participants in the conference call 120 can vary and may change dynamically. For example, the number of participants in the conference call 120 can change during the conference call 120, as participants may dynamically join or leave the conference.

The conferencing service 122 can include one or more servers, bridges, server applications, cloud services, routers, conference bridges, gateways, multipoint control units, conference applications, etc. Moreover, the infrastructure of the conferencing service 122 can vary in different deployments. For example, the conferencing service 122 can be deployed via an on-premises conferencing infrastructure for an organization or enterprise, as a cloud-based service hosted on one or more cloud computing environments or data centers, in a hybrid infrastructure including an on-premises conferencing infrastructure and cloud-based service, etc. In some cases, the conferencing service 122 can be a cloud-based conferencing service or infrastructure.

The conferencing service 122 can support different conferencing clients/endpoints and technologies. For example, the conferencing service 122 can support SIP (session initiation protocol) endpoints, H.323 videoconferencing endpoints, video participants, audio-only participants, VoIP (Voice over Internet Protocol) endpoints, PSTN endpoints, etc. In some examples, the endpoints 102-106 can run specific software which enables users 112-116 to participate in the conference call 120 hosted by the conferencing service 122. For example, the users 112-116 can use a conferencing application running at the endpoints 102-106 to join and participate in the conference call 120 hosted by the conferencing service 122. The conferencing application can function as a conference client at the endpoints 102-106. The conferencing application can be a native client application configured specifically for conferences hosted by the conferencing service 122, a web browser or browser plugin/component/application having specific functionalities for web conferencing, a client application that supports one or more conferencing technologies or protocols, or any other software application suitable for conferencing.

In some examples, the endpoints 102-106 and/or a conferencing application on the endpoints 102-106 can include various tools and capabilities (including software and/or hardware) for conferencing, such as network capabilities, video capabilities, audio capabilities, compression capabilities, NAT/Firewall traversal capabilities, one or more codecs, and so forth. Non-limiting examples of technologies that can be used by the endpoints 102-106 and/or a conferencing application on the endpoints 102-106 to participate, create or establish, manage, or otherwise support the conference call 120 hosted on the conferencing service 122 include SIP, H.263, H.264, H.264 High-Profile, H.264 SVC (SSL VPN client), H.239, H.320, H.323 SIP, VoIP, G.711, G.722, G.729, T.120, VP8, RTP, TCP/IP, HD video conferencing, remote frame buffer protocol, real-time protocol, and so forth.

Figure 2:
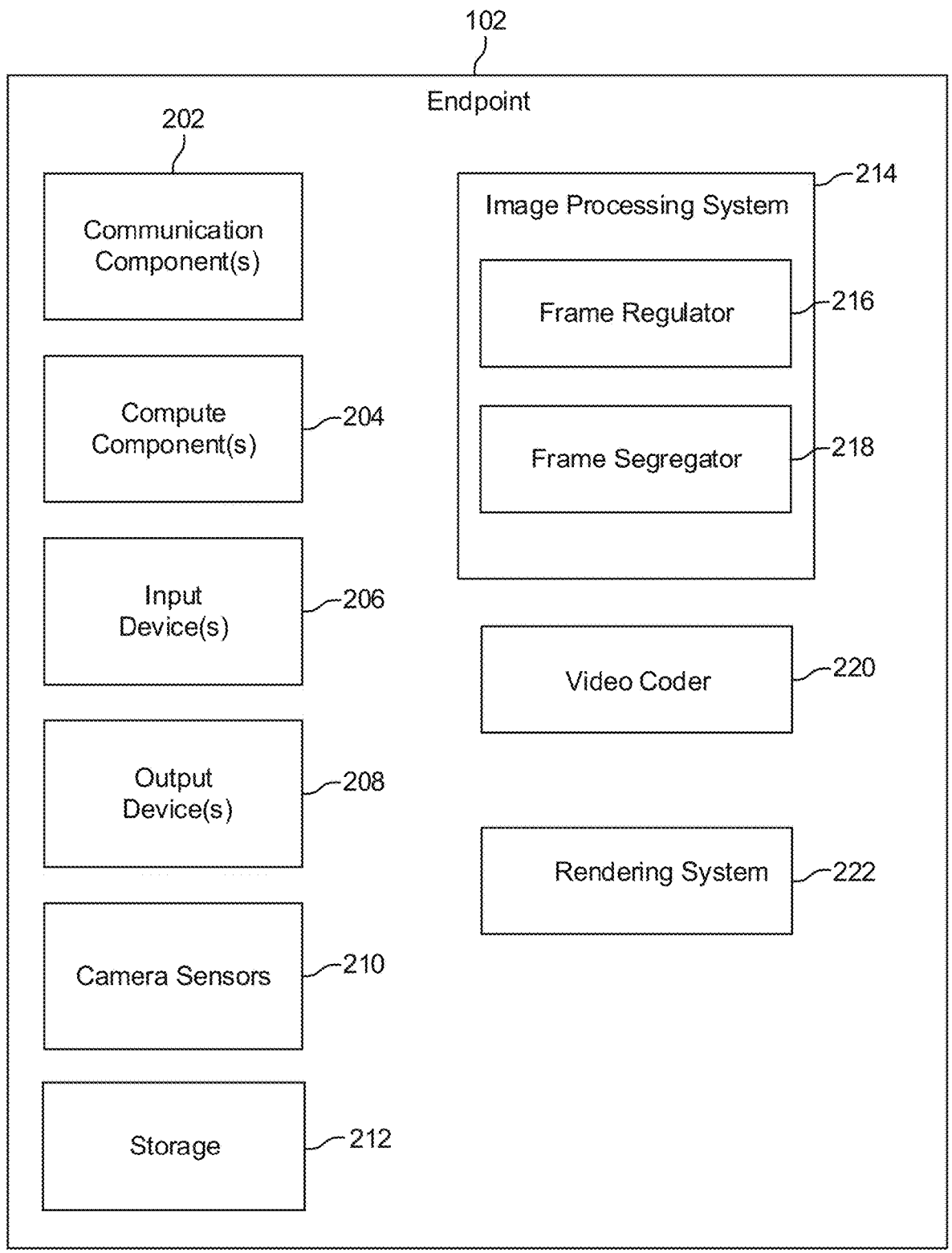
FIG. 2 illustrates an example of an endpoint that can implement video calling experiences, in accordance with some examples of the present disclosure.

FIG. 2 illustrates an example of an endpoint 102 that can implement the video calling aspects described herein. The endpoint 102 can include any computing device or phone system capable of establishing a video call. For example, the endpoint 102 can include a smartphone, a smart wearable device (e.g., a smart watch, smart goggles, etc.), a smart television, a gaming system, a tablet computer, an IP phone, a laptop computer, a car phone, a desk phone, an IoT device, an XR device, or any other communication device capable of participating on a video call. The endpoint 102 can support video and voice/audio as further described herein.

In the example shown in FIG. 2, the endpoint 102 can include one or more communication components 202, one or more compute components 204, one or more input devices 206, one or more output devices 208, camera sensors 210, storage 212, an image processing system 214, a frame regulator 216, a frame segregator 218, a video coder (e.g., video encoder and/or video decoder) 220, and a rendering system 222. While the endpoint 102 is shown to include certain components, one of ordinary skill in the art will appreciate that the endpoint 102 can include more or fewer (and/or different) components than those shown in FIG. 2. For example, the endpoint 102 can include, in some instances, one or more memory devices (e.g., RAM, ROM, cache, and/or the like), one or more cameras, and/or any other hardware or processing devices that are not shown in FIG. 2. An illustrative example of a computing device and hardware components that can be implemented by the endpoint 102 is described below with respect to FIG. 8.

In some examples, the one or more communication components 202 can include a cellular antenna for communicating over cellular networks, a WIFI antenna for communicating over a wireless local area network (WLAN), a network interface for connecting the endpoint 102 to a data network (e.g., wired and/or wireless network), and/or an interface component for connecting the endpoint 102 to a telephone landline. In some cases, the one or more communication components 202 can also include other antennas or communication interfaces such as, for example, a Bluetooth antenna, a GPS antenna, and/or any other suitable hardware component for sending and/or receiving wired and/or wireless signals. The endpoint 102 can use the one or more communication components 202 to establish, and participate in, a video call (e.g., 100, 120). The endpoint 102 can also use the one or more communication components 202 to send and receive data from other devices.

The one or more compute components 204 can include a central processing unit (CPU), a graphics processing unit (GPU), a digital signal processor (DSP), an image signal processor (ISP), an application-specific integrated circuit (ASIC), a controller device, and/or any other processing device. The one or more compute components 204 can perform various operations and can manage/control other components of the endpoint 102, including the one or more communication components 202, the one or more input devices 206, the one or more output devices 208, the camera sensors 210, the storage 212, etc. The compute components 204 can implement the image processing system 214, the frame regulator 216, the frame segregator 218, the video coder 220, and/or the rendering system 222. In some examples, the compute components 204 can also implement one or more other processing engines.

The one or more input devices 206 can include a keypad, a touch screen, a microphone, an image sensor, a controller, a keyboard, a pointing device, and/or any other input device capable of receiving a user input in any modality of input (e.g., mechanical motion, audio, visual, etc.). A user can use the one or more input devices 206 to manage a call (e.g., initiate the call, terminate the call, place the call on hold, enable one or more components of the endpoint 102, activate one or more features/functionalities, etc.), interact with the endpoint 102, provide inputs, and activate and/or manage one or more features and/or controls, such as a frame/subject selection feature, a frame arrangement/configuration feature, a tracking feature, an object detection feature, a hold feature, a mute function, a record function, volume controls, endpoint settings, call settings, etc.

The one or more output devices 208 can include a display. In some examples, the one or more output devices 208 can also include a speaker(s), a projector, and/or any component capable of outputting data. For example, in some cases, the one or more output devices 208 can include a touch screen capable of displaying content and receiving user inputs.

The endpoint 102 can implement the camera sensors 210 to capture images/frames. For example, the endpoint 102 can implement the camera sensors 210 to capture video frames for a video call. In some examples, the camera sensors 210 can include one or more front camera sensors and one or more back/rear camera sensors. In other examples, the camera sensors 210 can include any other multi-camera arrangement/configuration. In some cases, the endpoint 102 can include one or more additional sensors such as, for example and without limitation, an inertial measuring unit (IMU), a motion detection sensor, a light sensor, an audio sensor, an accelerometer, a gyroscope, a magnetometer, an altimeter, a tilt sensor, a light detection and ranging (LIDAR) sensor, a radio detection and ranging (RADAR) sensor, a proximity sensor, and/or any other sensor. In some cases, the camera sensors 210 and/or the additional sensors can be used to detect an object, detect a location of an object, detect one or more conditions (e.g., light, motion, etc.), capture data (e.g., image data, audio, etc.), measure one or more characteristics of an object or environment (e.g., orientation, shape, size, state, etc.), collect specific types of measurements, etc.

The storage 212 can include any storage device(s) for storing data, such as image data, files, software, videos, text data, messages, audio data, device/component profiles, user profiles, settings, user inputs, network data, logs, etc. Moreover, the storage 212 can store data from any of the components of the endpoint 102. For example, the storage 212 can store data from the one or more communication components 202, the one or more compute components 204, the one or more input devices 206, the one or more output devices 208, the camera sensors 210, the image processing system 214, the frame regulator 216, the frame segregator 218, the video coder 220, and the rendering system 222.

The image processing system 214 can perform any image processing tasks. In some examples, the image processing system 214 can process frames captured by the camera sensors 210. In some cases, the image processing system 214 can perform object detection to detect one or more targets (e.g., faces, users, animals, backgrounds, structures, etc.) depicted in a frame(s), object tracking to track one or more targets depicted in a frame(s), image stylization, downscaling/upscaling, chroma keying, image segmentation, filtering, demosaicking, denoising, interpolation, blurring, cropping, color correction, image enhancement, etc.

The frame regulator 216 can regulate a video call by eliminating frames captured by the camera sensors 210 and/or portions of frames captured by the camera sensors 210. For example, the frame regulator 216 can remove one or more faces depicted in one or more frames captured by the camera sensors 210. In some examples, the endpoint 102 can present to the user a preview of subjects (e.g., users, faces, etc.) depicted in frames captured by the camera sensors 210. The user can select, from the preview, any subjects that the user wants to exclude (and/or include) from the frames transmitted to another endpoint participating in a video call with the endpoint 102. The frame regulator 216 can then remove, from the frames captured by the camera sensors 210, any subjects that the user does not want to include in the frames sent to the other endpoint.

In some cases, the frame regulator 216 can use metadata to determine the location of one or more subjects within one or more frames captured by the camera sensors 210, and use the location of the one or more subjects to remove any subjects that the user wants excluded from the frames sent to the other endpoint. In some examples, the metadata can include the coordinates of any faces depicted in a frame(s) captured by the camera sensors 210.

The frame segregator 218 can restructure multiple frames captured by the camera sensors 210 into a single frame. For example, the frame segregator 218 can merge/combine frames from the camera sensors 210 into a single frame for transmission to another endpoint (e.g., during a video call). In some examples, the frame segregator 218 can arrange portions/regions of frames into a single frame, and manage the placement of the portions/regions within the single frame. For example, the frame segregator 218 can merge/combine a region of a frame capturing a face with another region of another frame capturing another frame, into a single frame depicting the two faces. The frame segregator 218 can arrange the faces within the single frame according to any arrangement. To illustrate, the frame segregator 218 can arrange the faces to appear side-by-side within the single frame (e.g., the merged/combined frame), top and bottom within the single frame, picture-in-picture, or any other arrangement/configuration.

The video coder 220 can perform video coding operations on the frames captured by the camera sensors 210. For example, the video coder 220 can perform video encoding, video decoding, or both video encoding and video encoding. The rendering system 222 can render data on a display device of the endpoint 102. For example, the rendering system 222 can render frames captured by the camera sensors 210, frames received from another endpoint, a preview of frames captured by the camera sensors 210, a user interface, and/or any other data as further described herein.

In some examples, the endpoint 102 can turn on (and/or maintain on) the camera sensors 210 (e.g., can turn on front and back camera sensors). In some cases, the camera sensors 210 can be used/shared by multiple users during a video call to allow the camera sensors 210 to capture the multiple users on the video call from the same device (e.g., the endpoint 102). In some examples, the endpoint 102 can track any of the users and make any adjustments to ensure the users are depicted by the video frames captured by the camera sensors 210 even if one or more of the users moves during the video call.

In some examples, the endpoint 102 can use a lower-power facial tracking mode (e.g., relative to a higher-power facial tracking mode available at the endpoint 102 which uses higher-power resources and/or implements higher power/complexity software components) to track users during a video call. To illustrate, if a first user is using the endpoint 102 to conduct a video call with a second user on another endpoint, and a third user that walks into the first user's room/space during the video call wants to participate in the video call, the endpoint 102 can capture frames (e.g., via the camera sensors 210) of the first user and the third user, merge/combine the frames depicting the first user and the third user into a single frame, and send the single frame to the second user's endpoint. The second user can then see the first user and the third user within the single frame transmitted by the endpoint 102. For example, the endpoint 102 can take the frames of the first user and the third user and arrange the frames so one frame is above or next to the other frame (or any other arrangement) and transmit the resulting frame to the second user's endpoint (e.g., as part of the video call). In some examples, the endpoint 102 can stitch the frames of the first user and the third user into a single frame to accommodate both users participating in the video call from the same device.

In some cases, if there are multiple users within the FOV of one of the camera sensors 210 (e.g., a back/rear camera sensor), the endpoint 102 can separate the frames from that camera sensor and send them as separate frames stitched together with a frame capturing a user within the FOV of another one of the camera sensors 210 (e.g., a front camera sensor). For example, if the third user and a fourth user are or move within the FOV of a back camera sensor of the endpoint 102 while the first user is within the FOV of a front camera sensor of the endpoint 102, the first user would generally need to switch the video from the front camera sensor to the back camera sensor to show the third user and the fourth user within the frames transmitted during the video call. In this example scenario, the endpoint 102 can segregate the frames depicting the third user and the fourth user into separate characters as further described herein.

In some cases, a user using the endpoint 102 to participate in a video call can call (e.g., trigger, request, initiate, etc.) a camera-switching video call user interface (UI). The camera sensors 210 of the endpoint 102 can be turned on and can send captured frames to the compute components 204 (e.g., to a processor such as a digital signal processor), which are then sent to a display for the user to preview the frames. In some examples, the endpoint 102 can send the feeds from the camera sensors 210 in a segregated manner (e.g., segregated by a line, character, object, shape, etc.). The endpoint 102 can implement the frame segregator 218 to segregate the captured faces and show them on the preview UI.

In some examples, the sender (e.g., the user sending the video feed to the other user(s) on the video call) can select which faces the sender wants to send a preview of on a particular side or region of the UI, and receive a permission message asking the sender to confirm the input faces. The selected faces can then be sent to the video coder 220 to be carried over to the receiver through the video calling pipeline. The receiver can receive the video call frames which depict the sender as well as the additional users participating in the video call through the endpoint 102.

In some examples, the camera sensor feeds can be regulated using the frame regulator 216, which can check for subjects' frames and reduce the video coder workload by sending the camera sensor feeds only when subjects are present. In some cases, a camera sensor feed can include a timestamp, buffer information, and/or metadata. In some examples, the metadata can include coordinates of a target (e.g., a face, a user, etc.) and/or a coordinates metadata tag for the target. The coordinates can be used to segregate targets (e.g., users, faces, etc.) in the video call. Before using the video feed, the endpoint 102 can call a user inputs pipeline to determine what targets the user wants to send from the targets within the FOVs of the camera sensors 210. This information can be relayed to the frame regulator 216 and the frame segregator 218. The frame regulator 216 can eliminate the targets (e.g., users, faces, etc.) that the user of the endpoint 102 does not want included in the video call, such as the targets that are not selected by the user for inclusion or that are selected by the user for exclusion. The frame segregator 218 can restructure the frames into a single frame as per the number of targets being included.

In some cases, the endpoint 102 can implement a subject tracking mode. For example, the endpoint 102 may send frames only when a user is present in the FOV of any of the camera sensors 210. This can involve subject tracking. As the endpoint 102 detects facial features, the endpoint 102 can stop sending the frames from one camera sensor (e.g., a front camera sensor) when users move within the FOV of another camera sensor (e.g., a back/rear camera sensor). The endpoint 102 can thus send frames captured from one camera sensor when the user(s) is within the FOV of that camera sensor and send frames captured by a different camera sensor when the user(s) moves within the FOV of the different camera sensor.

Figure 3:
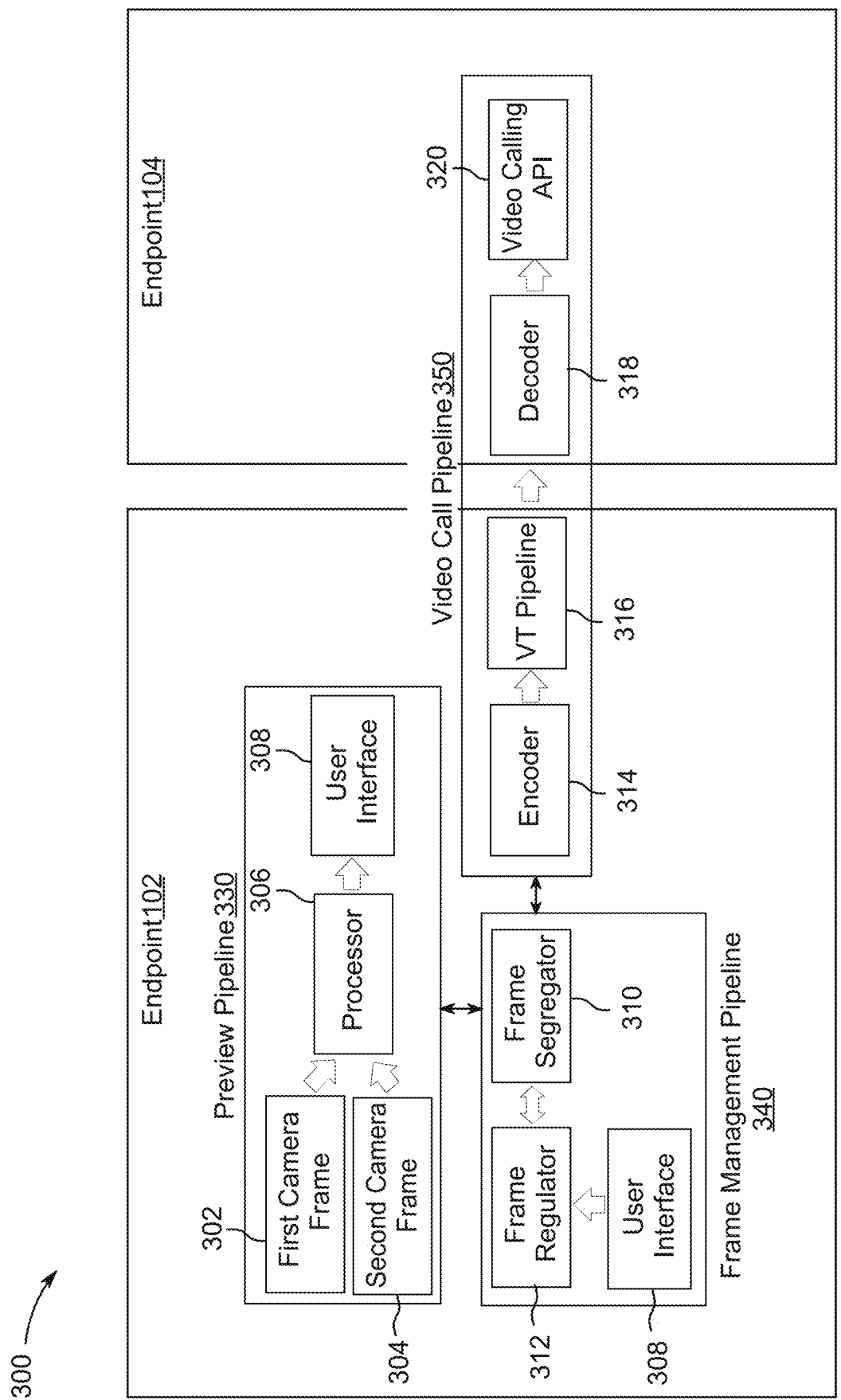
FIG. 3 is a diagram illustrating an example pipeline for providing an example video calling experience, in accordance with some examples of the present disclosure.

FIG. 3 is a diagram illustrating an example pipeline 300 for providing an example video calling experience in accordance with some examples of the present disclosure. In this example, the pipeline 300 includes a preview pipeline 330, a frame management pipeline 340, and a video call pipeline. In general, the preview pipeline 330 can present a user a preview of frames captured for the video call and targets (e.g., users, faces, etc.) depicted in the preview frames, the frame management pipeline 340 can remove any targets in the preview frames that the user does not want to include in the video call frames, and the video call pipeline 350 can manage the video call session and data transfer, encode and send the video stream, decode and play received video streams, etc.

In the preview pipeline 330, the camera sensors 210 of the endpoint 102 can generate a first camera frame 302 and a second camera frame 304. In some examples, the first camera frame 302 can be part of a camera feed from a first camera sensor, and the second camera frame 304 can be part of a different camera feed from a second camera sensor. For example, the first camera frame 302 can be part of a camera feed from a front camera sensor located on a front of the endpoint 102 and the second camera frame 304 can be part of a camera feed from a back/rear camera sensor located on the back of the endpoint 102. For simplicity and explanation purposes, FIG. 3 only shows two camera frames or feeds from two camera sensors. However, in some cases, the camera sensors 210 can generate more or less camera frames/feeds than shown in FIG. 3.

The camera sensors 210 can provide the first camera frame 302 and the second camera frame 304 to a processor 306, which can generate/render a user interface 308 including a preview of (e.g., depicting) the first camera frame 302 and the second camera frame 304. The processor 306 can provide, to a display, the user interface 308 with the preview for presentation to the user of the endpoint 102. The processor 306 can represent one or more processors such as, for example, one or more DSPs, CPUs, ISPs, etc. In some cases, the processor 306 can stitch together the first camera frame 302 and the second camera frame 304 into a preview and send the preview (e.g., the stitched frames) to the display for presentation. In some examples, the processor 306 can prepare/configure the first camera frame 302 and second camera frame 304 to appear segregated/separated by a visual marker such as, for example, a line, a box, a border, etc. This can indicate to the user that different portions of the preview being displayed correspond to different frames (and what portions of the preview correspond to different frames). In some cases, the processor 306 can communicate with the frame segregator 310 to segregate the first camera frame 302 and the second camera frame 304 within the preview, as previously explained.

In some examples, the user of the endpoint 102 can select specific frames in the preview (and/or specific targets (e.g., users, faces, etc.) depicted by specific frames in the preview) that the user wants to be included and/or excluded in the video sent to the other endpoint on the video call. For example, if the preview includes a first frame depicting a first face, a second frame depicting a second face, and a third frame depicting a third face, the user can provide an input selection (e.g., via the user interface 308) indicating that the first face depicted in the first frame and the second face depicted in the second frame should be included in the video sent to the other endpoint on the video call, and the third face depicted in the third frame should be excluded/removed.

In the frame management pipeline 340, the frame regulator 312 can provide to the frame segregator 310 any of the frames being sent to the other endpoint (e.g., the frames depicting specific or selected targets). The frame regulator 312 can include and exclude any frames (and/or depicted targets) based on the user's input selection. To illustrate, in the previous example, if the user selects to keep the first face and second face depicted in the first and second frames but exclude the third face depicted in the third frame, the frame regulator 312 can remove the third frame depicting the third face and provide the first frame and second frame to the frame segregator 310. If the user does not select to exclude any frames (and/or depicted targets such as faces) from the preview, the frame regulator 312 can include and send all the frames in the preview to the frame segregator 310. In some cases, the user interface 308 can present a permission message requesting confirmation from the user of the input frames (and/or depicted targets) to be included in the stream sent to the other endpoint (e.g., the frames and/or depicted targets selected by the user).

In some examples, the frame regulator 312 can identify the location of the targets depicted in the specific camera frames based on metadata associated with the camera frames. The metadata can include coordinates identifying the location of targets within the frames. The frame regulator 312 can use the coordinates to identify and keep or remove specific targets depicted in the frames as per the user selection(s). For example, if the user selects to keep a first face depicted in the first camera frame 302 and a second face depicted in the second camera frame 304 but exclude one or more third faces depicted in a third camera frame, the frame regulator 312 can use metadata associated with the first, second and third camera frames to determine the location of the first face, the second face, and the one or more third faces within the first, second and third camera frames. The metadata can include the coordinates of the first face, the second face, and the one or more third faces within the first camera frame 302, the second camera frame 304, and the third camera frame, respectively. The frame regulator 312 can use the coordinates to then remove the one or more third faces in the third camera frame and keep the first and second faces to be included in the stream sent to the other endpoint. The frame regulator 312 can provide the first camera frame 302 depicting the first face and the second camera frame 304 depicting the second face to the frame segregator 310.

In other examples, the frame regulator 312 can perform object detection to determine the location of the faces depicted in the camera frames. For example, the frame regulator 312 can process the camera frames to detect the faces depicted in the camera frames and their location within the camera frames.

The frame regulator 312 can provide the first camera frame 302 and the second camera frame 304 with or without any processing and/or changes to the first camera frame 302 and second camera frame 304. For example, in some cases, the frame regulator 312 can crop the first camera frame 302 to include the first face and exclude one or more regions of the first camera frame 302 around the first face, and crop the second camera frame 304 to include the second face and exclude one or more regions of the second camera frame 304 around the second face.

The frame segregator 310 can use the frames from the frame regulator 312 (e.g., the frames set to be included in the stream and excluding any frames removed by the frame regulator 312, if any) to generate a single frame including the frames from the frame regulator 312. For example, if the frame segregator 310 receives the first camera frame 302 and the second camera frame 304 from the frame regulator 312, the frame segregator 310 can restructure (e.g., merge/combine, arrange, etc.) the first camera frame 302 and the second camera frame 304 into a single frame depicting the targets (e.g., users, faces, etc.) included in the first camera frame 302 and the second camera frame 304. In some cases, the frame segregator 310 can segregate the first camera frame 302 and the second camera frame 304 within the single frame generated by the frame segregator 310. For example, the frame segregator 310 can configure/arrange/depict the first camera frame 302 and second camera frame 304 within the single frame so as to appear segregated/separated by a visual marker within the single frame. The visual marker can include, for example and without limitation, a line, a box, a border, and/or any other visual indicia.

In some examples, to generate the single frame, the frame segregator 310 can identify the location of the targets depicted in the specific camera frames based on metadata associated with the camera frames. As previously explained, the metadata can include coordinates identifying the location of targets within the frames. The frame segregator 310 can use the coordinates to identify the location of the specific targets depicted in the camera frames and arrange the targets within the single frame. For example, if the frame segregator 310 receives, from the frame regulator 312, a first camera frame (e.g., first camera frame 302) depicting a first face and a second camera frame (e.g., second camera frame 304) depicting a second face, the frame segregator 310 can use the face coordinates included in metadata associated with the first and second camera frames to identify the location of the faces in the first and second camera frames. The frame segregator 310 can use the coordinates to know where the faces are located within the camera frames in order to segregate and/or arrange the faces within the single frame generated by the frame segregator 310.

In other examples, the frame segregator 310 can perform object detection to determine the location of the targets depicted in the camera frames. For example, the frame regulator 312 can process the camera frames to detect the faces depicted in the camera frames and their location within the camera frames.

The frame segregator 310 can use the first camera frame 302 and the second camera frame 304 to generate the single frame with or without first processing and/or modifying the first camera frame 302 and second camera frame 304. For example, in some cases, the frame segregator 310 can crop the first camera frame 302 to include the first face and exclude one or more regions of the first camera frame 302 around the first face, and crop the second camera frame 304 to include the second face and exclude one or more regions of the second camera frame 304 around the second face. The frame segregator 310 can then use the cropped camera frames to generate the single frame depicting the targets from the first and second camera frames.

The frame segregator 310 can provide the single frame generated to the video call pipeline 350. In the video call pipeline 350, the encoder 314 can encode the single frame and provide the encoded frame to the videotelephony pipeline 316 for transmission to the other endpoint(s) on the call. The encoder 314 can be hosted by the endpoint 102. For example, the encoder 314 can be part of the video coder 220 on the endpoint 102. The videotelephony pipeline 316 can manage the video call data transfer (e.g., the encoded frame/stream) from the endpoint 102, manage the data connection (e.g., the video call connection) from the endpoint 102, manage the control or signaling plane, manage the media plane, manage video call controls, setup the video call, manage/implement videotelephony protocols, and/or perform any other videotelephony operations.

The videotelephony pipeline 316 can transmit the encoded frame to the other endpoint(s) on the video call. The other endpoint(s) on the video call can use the decoder 318 to decode the encoded frame for presentation at the other endpoint(s). In some cases, the decoder 318 can provide the decoded frame to a video calling application programming interface (API) 320. The video calling API 320 can provide the decoded frame to a video calling application at the other endpoint(s) for rendering. The video calling API 320 can generate calls (e.g., requests, responses, etc.) to the video calling application. In some cases, the video calling API 320 can integrate one or more video calling tools such as, for example, video chat, screen sharing, recording, workflow integration, effects, filters, messaging, etc.

In some cases, the endpoint 102 can implement a subject tracking mode to track the presence of users within the field-of-views (FOVs) of camera sensors (e.g., camera sensors 210) of the endpoint 102. In the subject tracking mode, the endpoint 102 can stop capturing and/or sending frames from a camera sensor when there are no users within the FOV of that camera sensor (e.g., when a user moves from an area within the FOV of the camera sensor to an area outside of the FOV of the camera sensor), and can start capturing and/or sending frames from a camera sensor when it determines that one or more users are within the FOV of that camera sensor (e.g., when one or more users move to an area within the FOV of camera sensor). For example, the endpoint 102 can analyze camera frames captured by the camera sensors 210 to determine whether any users are depicted in the camera frames. The endpoint 102 can detect facial features within a camera frame and determine that a user(s) is present within the FOV of the camera sensor that captured that camera frame. If no users are detected within a camera frame captured by a camera sensor, the endpoint 102 can stop including in the video call feed frames from that camera sensor until a user(s) is detected within the FOV of that camera sensor.

For example, the endpoint 102 can process camera frames from the camera sensors 210 and determine whether any users are within the FOVs of the camera sensors based on any facial features detected in the camera frames. If a user moves from an area within a FOV of a back/rear camera sensor of the endpoint 102, the endpoint 102 can stop sending camera frames from the back/rear camera sensor to the other endpoint 104 on the video call. If the user moves within the FOV of a front camera sensor of the endpoint 102, the endpoint 102 can capture a camera frame of the user using the front camera sensor and include the camera frame of the user in the stream sent to the other endpoint 104. If the user moves back to an area within the FOV of the back/rear camera sensor, the endpoint 102 can again include camera frames captured by the back/rear camera sensor (and depicting the user) in the stream sent to the other endpoint 104.

Figure 4:
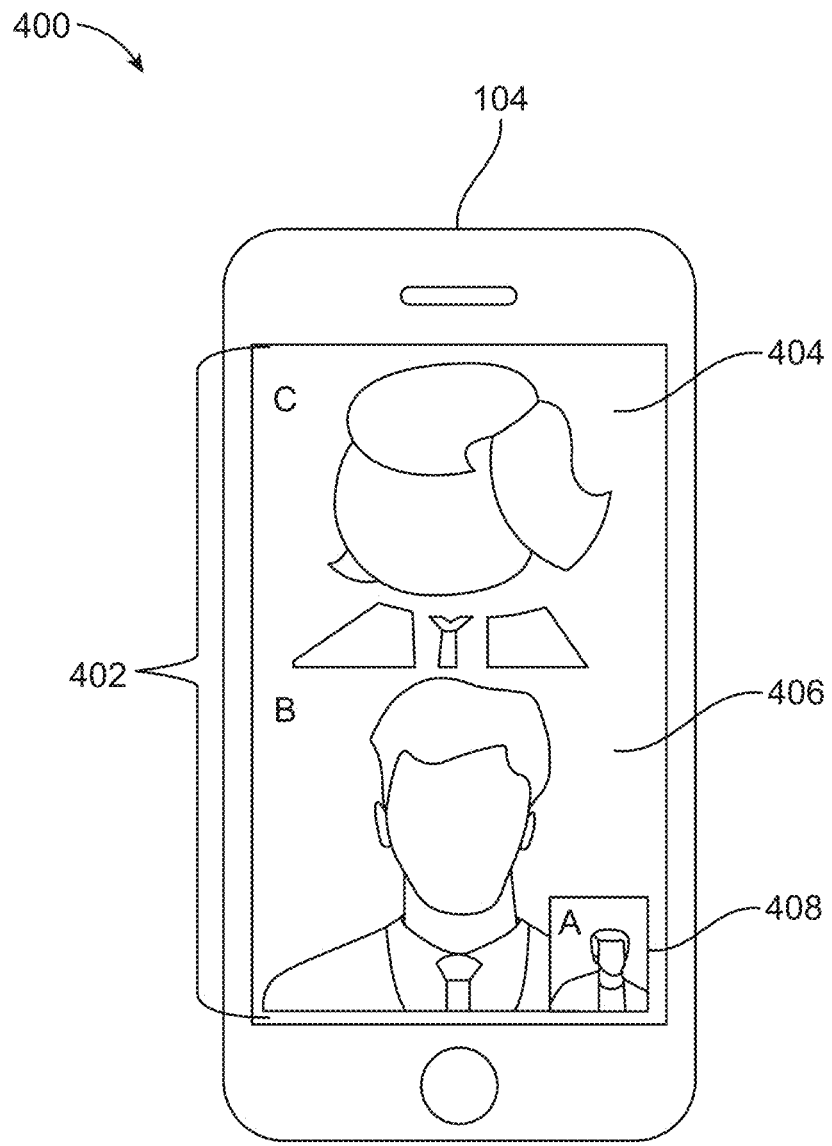
FIG. 4 illustrates an example video calling interface depicting a merged camera frame rendered at a receiver's endpoint, in accordance with some examples of the present disclosure.

FIG. 4 illustrates an example video calling interface 400 depicting a merged camera frame 402 rendered at a receiver's endpoint 104. The endpoint 104 can receive the merged camera frame 402 from the sender's endpoint 102. The endpoint 102 can generate (e.g., via the frame segregator 310 and frame regulator 312) the merged camera frame 402 as previously described.

As shown in FIG. 4, the merged camera frame 402 includes a first camera frame 404 depicting a first user and a second camera frame 406 depicting a second user. The user at the endpoint 104 can thus see the first user and the second user within the video calling interface 400. The first user and the second user can be users of the endpoint 102. In some examples, the endpoint 102 can capture the first camera frame 404 depicting the first user using a first camera sensor of the endpoint 102 and the second camera frame 406 depicting the second user using a second camera sensor of the endpoint 102. Thus, the camera frames of the first user and the second user can be captured from the same device, and the first user and the second user can participate in the video call with the user of the endpoint 104 from the same device (e.g., endpoint 102).

The first camera frame 404 depicting the first user and the second camera frame 406 depicting the second user can be arranged within the merged camera frame 402 in any manner. For example, in FIG. 4, the first camera frame 404 depicting the first user is arranged above the second camera frame 406 depicting the second user. However, this arrangement is merely one illustrative example provided for explanation purposes. Other examples can include any other arrangement.

In some examples, the video calling interface 400 can also display a camera frame 408 depicting the user at the endpoint 104. Thus, the user at the endpoint 104 can view the first user and the second user within the merged camera frame 402 and can also view the camera frame of herself/himself within the video calling interface 400. The camera frame 408 of the user at the endpoint 104 can be arranged within the video calling interface 400 in any manner. For example, the camera frame 408 can be displayed next to the merged camera frame 402, within a region of the merged camera frame 402, or according to any other arrangement. Moreover, the camera frame 408 can be displayed as captured by the camera sensor of the endpoint 104 or according to a modified configuration such as, for example, a modified size, a modified background, a modified shape, a cropped configuration, a visual marker (e.g., a box, a highlight, a line, a label, an outline, etc.) identifying the camera frame 408 as the frame of the receiver (e.g., the user at endpoint 104), and/or any other configuration.

Figure 5:
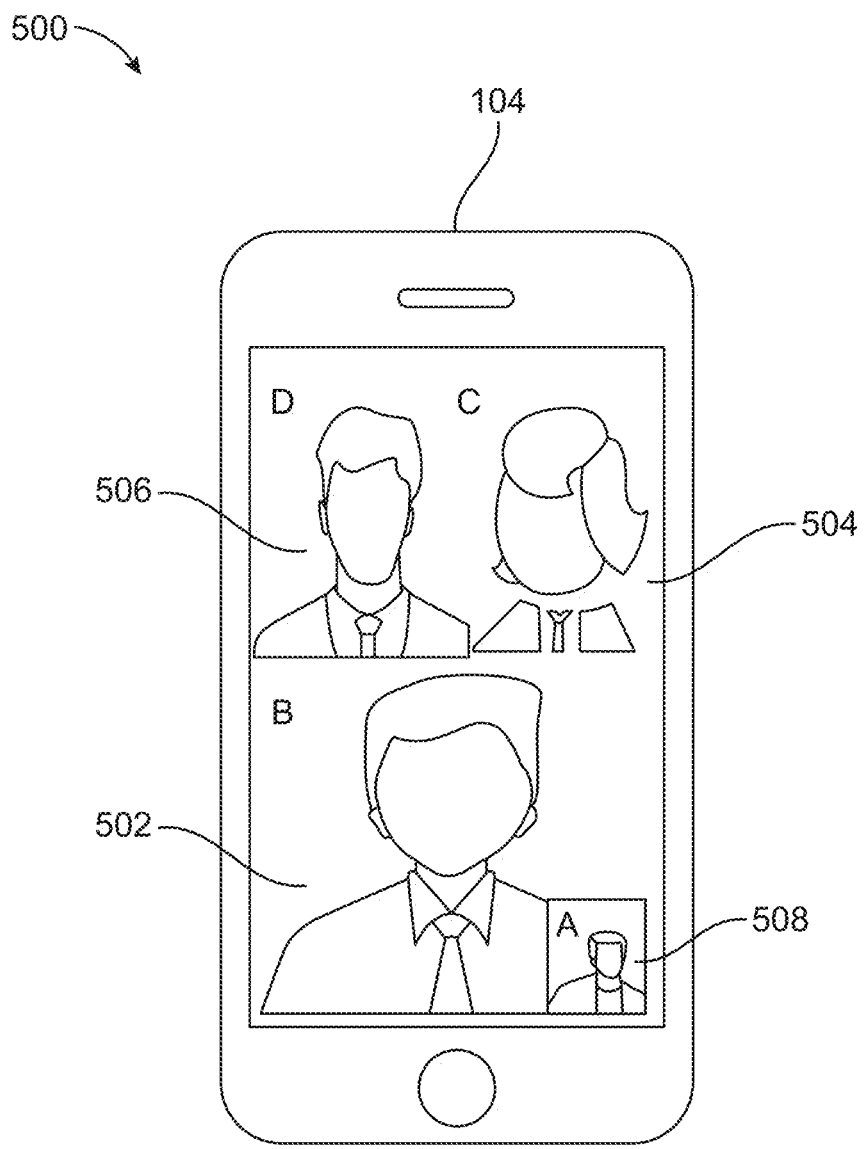
FIG. 5 illustrates another example video calling interface depicting a merged camera frame rendered at a receiver's endpoint, in accordance with some examples of the present disclosure.

FIG. 5 illustrates another example video calling interface 500 depicting a merged camera frame rendered at a receiver's endpoint 104. The endpoint 104 can receive the merged camera frame from the sender's endpoint 102. The endpoint 102 can generate (e.g., via the frame segregator 310 and frame regulator 312) the merged camera frame as previously described.

In this example, the merged camera frame includes a first frame 502 depicting a first user at the sender's endpoint 102, a second frame 504 depicting a second user at the sender's endpoint 102, and a third frame 506 depicting a third user at the sender's endpoint 102. The first frame 502 can be captured by a first camera sensor of the sender's endpoint 102. The second frame 504 can be captured by a second camera sensor of the sender's endpoint 102. The third frame 506 can be captured by the second camera sensor of the sender's endpoint 102 or a third camera sensor of the sender's endpoint. For example, in some cases, the first frame 502 can be captured by a front camera sensor of the sender's endpoint 102, and both the second frame 504 and the third frame 506 can be captured by the same camera sensor of the sender's endpoint 102, such as a back/rear camera sensor.

In some examples, a camera sensor of the sender's endpoint 102 can capture a camera frame depicting both the second user and the third user. The sender's endpoint 102 can segregate (e.g., via the frame segregator 310) the second user and the third user within the captured camera frame so as to appear as separate frames depicting the second user and the third user. For example, the sender's endpoint 102 can arrange the second user and the third user depicted in a camera frame, within a merged camera frame and include a visual marker (e.g., a line, a box, a highlight, an outline, shading, an edge/border, a label, etc.) in the merged frame that visually divides/segregates the second user and the third user within the merged frame so as to appear as separate frames depicting the second user and third user. The frame segregator 310 at the sender's endpoint 102 can use coordinates included in metadata associated with the camera frame depicting the second and third users to identify the location of the second and third users within the camera frame. The frame segregator 310 at the sender's endpoint 102 can use the determined location of the second and third users to segregate the second and third users within the merged camera frame. In other cases, the frame segregator 310 can determine the location of the second and third users using object detection, and segregate the second and third users based on the determined locations.

The frame segregator 310 can similarly use the location of the first user to segregate the first user from the second and third users within the merged camera frame, as shown in FIG. 5. The frame segregator 310 can determine the location of the first user based on coordinates in associated metadata or via object detection, as previously described.

As shown in FIG. 5, the systems and techniques described herein can allow multiple users to participate in a video call from the same device and be visible at the other end of the video call (e.g., at endpoint 104). Moreover, the systems and techniques described herein can allow multiple users to be recorded from a same camera sensor and displayed at the other end of the video call (e.g., at endpoint 104) within the merged frame as if the multiple users were recorded from different camera sensors and/or as if the multiple users are participating in the video call from separate devices.

In some examples, the video calling interface 500 can also display a camera frame 508 depicting the user at the endpoint 104. Thus, the user at the endpoint 104 can view the first user, the second user, and the third user within the merged camera frame (e.g., frame 502, frame 504, frame 506) and can also view the camera frame of herself/himself within the video calling interface 500. The camera frame 508 of the user at the endpoint 104 can be arranged within the video calling interface 500 in any manner. For example, the camera frame 508 can be displayed next to the merged camera frame depicting the first, second, and third users; within a region of the merged camera frame; or according to any other arrangement. Moreover, the camera frame 508 can be displayed as captured by a camera sensor of the endpoint 104 or according to a modified configuration such as, for example, a modified size, a modified background, a modified shape, a cropped configuration, a visual marker (e.g., a box, a highlight, a line, a label, an outline, etc.) identifying the camera frame 508 as the frame of the receiver (e.g., the user at endpoint 104), and/or any other configuration.

Figure 6A:
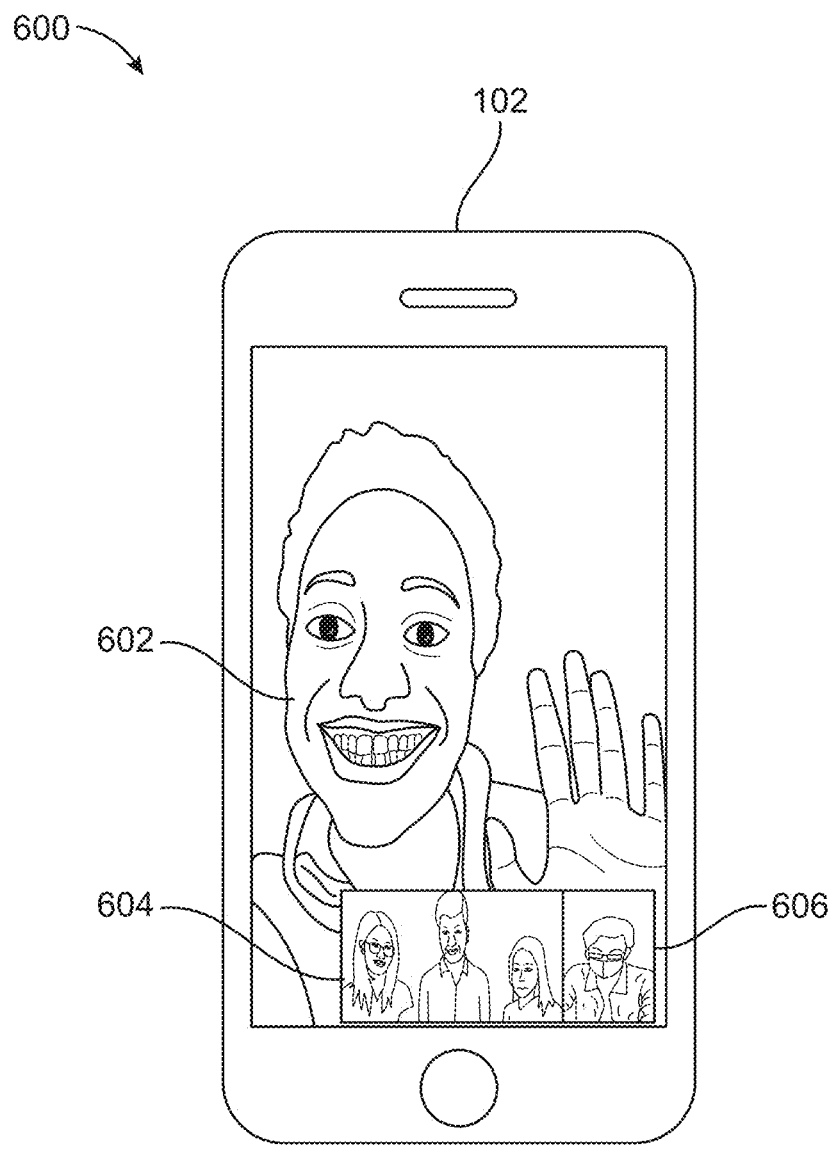
FIG. 6A illustrates an example user interface depicting an example preview generated by a sender's endpoint, in accordance with some examples of the present disclosure.

FIG. 6A illustrates an example user interface 600 depicting an example preview generated by the endpoint 102. In this example, the preview includes a camera frame 602 depicting a user on the other end of the video call, such as a user at endpoint 104. The endpoint 102 can receive the camera frame 602 from another endpoint (e.g., endpoint 104) and include the camera frame 602 in the preview.

The preview can also include a merged frame depicting multiple users at the endpoint 102. The merged frame can include a first frame 604 depicting one or more users at the endpoint 102 and a second frame 606 depicting one or more different users at the endpoint 102. In this example, the first frame 604 includes a frame of multiple users captured by a first camera sensor at the endpoint 102, such as a back/rear camera sensor. The second frame 606 includes a frame of a user captured by a second camera sensor at the endpoint 102, such as a front camera sensor. A user at the endpoint 102 can select any users/faces within the merged frame (e.g., the first frame 604 and the second frame 606) in the preview to be included or excluded from the merged frame transmitted to the other endpoint(s). The frame regulator 312 at the endpoint 102 can remove any users/faces selected for exclusion, and the frame segregator 310 can generate the merged frame including the users/faces selected for inclusion.

For example, if the user selects, from the preview, a first face within the first frame 604 for exclusion, the frame regulator 312 can remove the first face within the first frame 604 and keep the second face and third face within the first frame 604 that were not selected for exclusion. The frame segregator 310 can then generate a merged frame depicting the second face and the third face. The endpoint 102 can send the merged frame depicting the second and third faces to the other endpoint for display to the other user(s) on the video call.

Figure 6B:
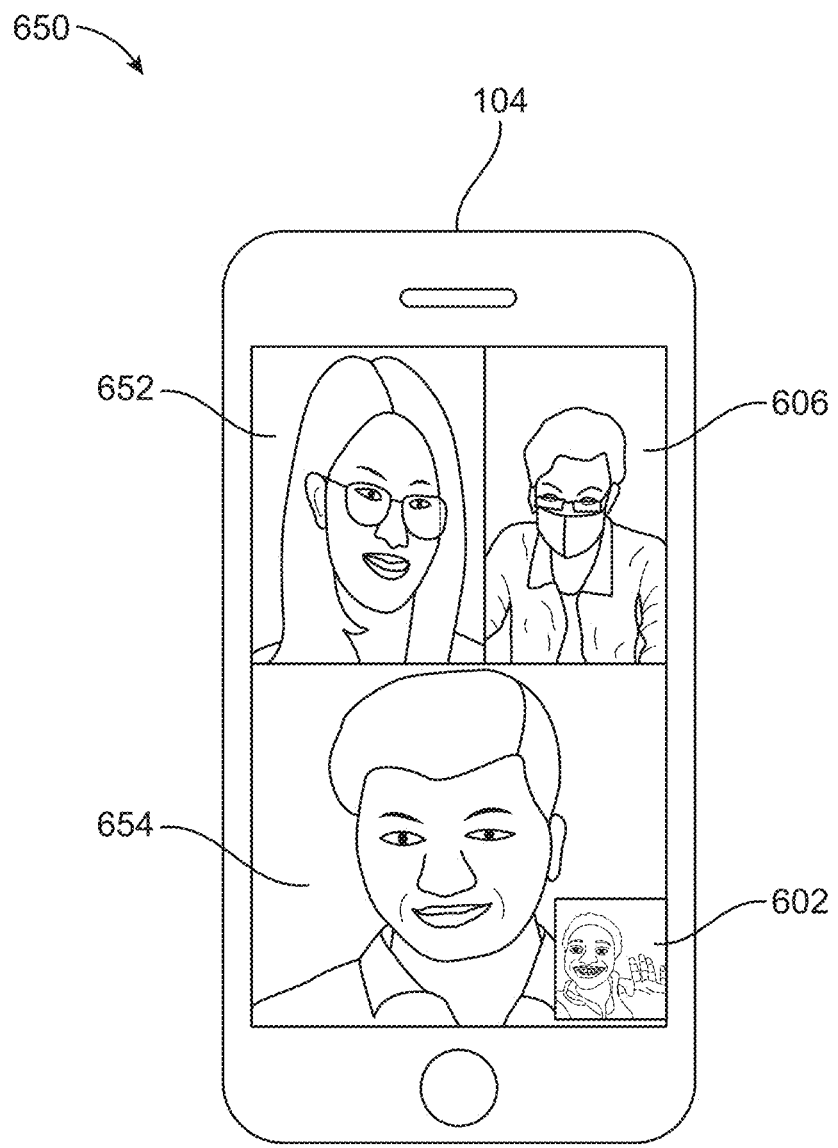
FIG. 6B illustrates an example user interface depicting a merged frame received from a sender's endpoint, in accordance with some examples of the present disclosure.

FIG. 6B illustrates an example user interface 650 depicting a merged frame received from the endpoint 102. In this example, the merged frame rendered at the endpoint 104 includes a frame 606 depicting a user selected for inclusion in the merged frame (e.g., via the preview shown in FIG. 6A and previously described), a frame 652 depicting another user selected for inclusion in the merged frame (e.g., via the preview shown in FIG. 6A), and another user selected for inclusion in the merged frame (e.g., via the preview shown in FIG. 6A and previously described).

However, as shown in FIG. 6B, the merged frame does not include one of the users depicted in the first frame 604 of the preview shown in FIG. 6A. Here, a user at the endpoint 102 selected that particular user for exclusion from the merged frame (or did not select that user for inclusion). Thus, the frame regulator 312 at the endpoint 102 removed that particular user from the frames provided to the frame segregator 310 at the endpoint 102. The frame segregator 310 generated the merged frame without including that particular user (and/or a frame depicting that particular user). Accordingly, that particular user is not visible within the merged frame rendered in the user interface 650 at the endpoint 104, even though that particular user was initially depicted in the same camera frame as the user depicted in the frames 606, 652, and 654, which was captured by a camera sensor of the endpoint 102. In this way, a user at the endpoint 102 can select which users should be depicted or removed from the merged frame sent to the endpoint 104, and the endpoint 102 can remove any users selected for exclusion from (or not selected for inclusion in) the merged frame sent to the endpoint 104, even if any of the removed users originally appeared in a same camera frame (e.g., captured by a same camera sensor) and/or even if any of the removed users originally appeared in a separate frame captured from the same endpoint.

Figure 7:
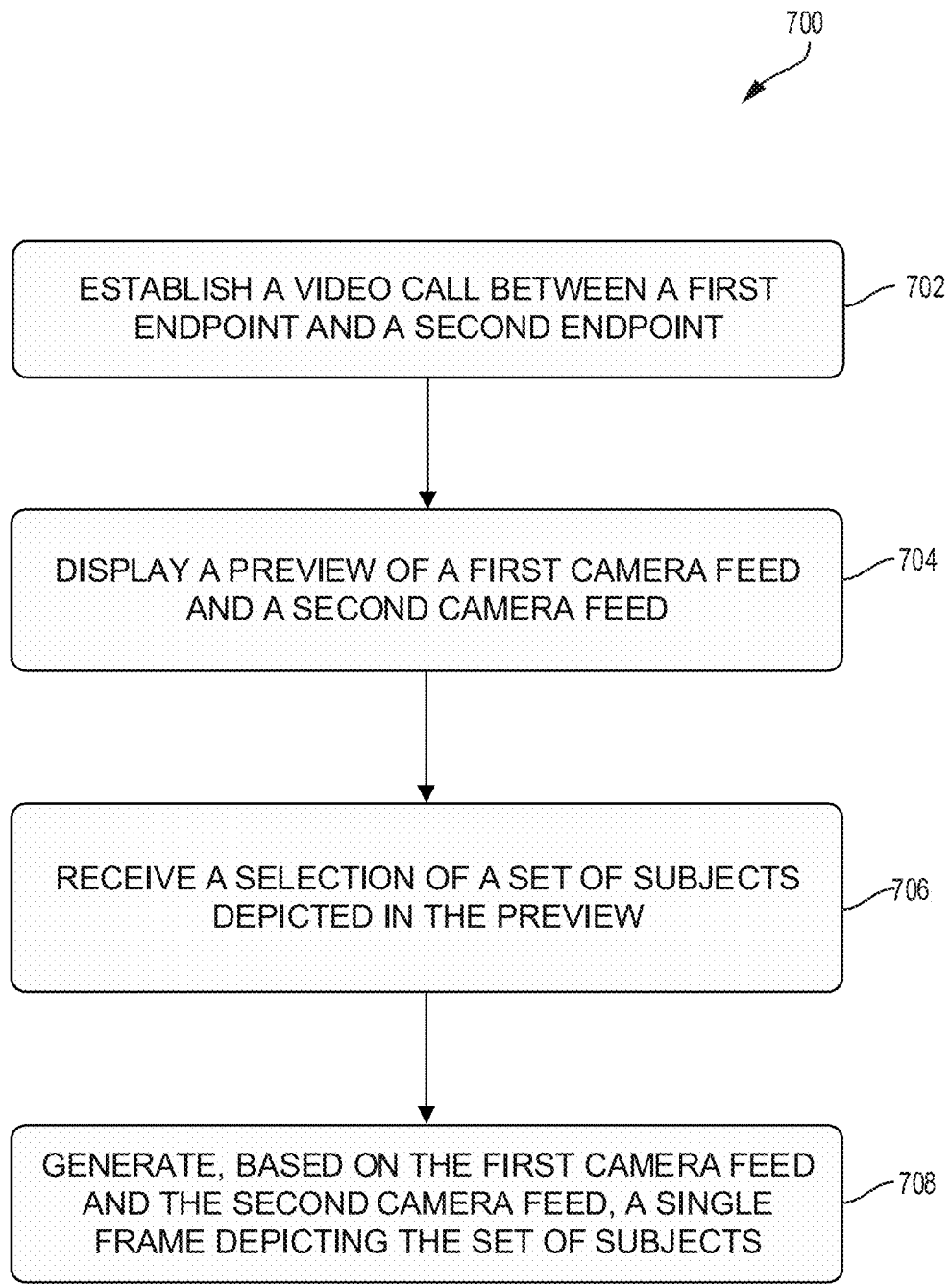
FIG. 7 is a flowchart illustrating an example process for generating video frames for a video call, in accordance with some examples of the present disclosure.

FIG. 7 is a flowchart illustrating an example process 700 for generating video frames for a video call. At block 702, the process 700 can include establishing a video call between a first endpoint (e.g., endpoint 102) and a second endpoint (e.g., endpoint 104).

At block 704, the process 700 can include displaying a preview of a first camera feed and a second camera feed. In some examples, the first camera feed can include a first video frame captured by a first image capture device of the first endpoint and a second video frame captured by a second image capture device of the first endpoint. In some examples, the first video frame and the second video frame can be visually separated within the preview.

In some aspects, the process 700 can include obtaining the first video frame from the first image capture device and the second video frame from the second image capture device.

At block 706, the process 700 can include receiving a selection of a set of subjects depicted in the preview. In some cases, the selection of the set of subjects includes a first input selecting the set of subjects to be included in the single frame and/or a second input selecting one or more subjects of the plurality of subjects to be excluded from the single frame.

At block 708, the process 700 can include generating, based on the first camera feed and the second camera feed, a single frame depicting the set of subjects. In some aspects, generating the single frame can include combining at least a portion of the first video frame and at least a portion of the second video frame into the single frame.

In some examples, combining at least a portion of the first video frame and at least a portion of the second video frame into the single frame can include arranging at least the portion of the first video frame and at least the portion of the second video frame into respective frame regions of the single frame. In some examples, each frame region can depict a respective subject from the set of subjects.

In some examples, the first video frame and the second video frame depict a plurality of subjects including the set of subjects. In some cases, the selection of the set of subjects includes a first input selecting the set of subjects to be included in the single frame and/or a second input selecting one or more subjects of the plurality of subjects to be excluded from the single frame. The one or more subjects can be different than the set of subjects.

In some cases, generating the single frame can include, based on the first input and/or the second input, excluding, from the single frame, the one or more subjects of the plurality of subjects. In some examples, the process 700 can include sending the single frame to the second endpoint. In some cases, excluding the one or more subjects from the single frame can include removing the one or more subjects from the preview, the first frame, the second frame, and/or the single frame.

In some cases, the first video frame can include one or more first subjects from the set of subjects and the second video frame can include one or more second subjects from the set of subjects. In some aspects, generating the single frame can include determining, based on first metadata associated with the first video frame, a respective location of each of the one or more first subjects within the first video frame; determining, based on second metadata associated with the second video frame, a respective location of each of the one or more second subjects within the second video frame; and based on the respective location of each of the one or more first subjects within the first video frame and the respective location of each of the one or more second subjects within the second video frame, determining a first portion of the first video frame depicting the one or more first subjects and a second portion of the second video frame depicting the one or more second subjects.

In some examples, the first metadata can include coordinates associated with the one or more first subjects and the second metadata can include coordinates associated with the one or more second subjects. In some cases, generating the single frame can include combining the first portion of the first video frame and the second portion of the second video frame into the single frame. In some aspects, combining the first portion of the first video frame and the second portion of the second video frame into the single frame can include placing the first portion of the first video frame and the second portion of the second video frame within respective frame regions of the single frame. In some examples, a first region of the respective frame regions depicts the one or more first subjects and a second region of the respective frame regions depicts the one or more second subjects.

In some aspects, generating the single frame can include rendering and/or depicting at least a portion of the first video frame and at least a portion of the second video frame within the single frame. In some cases, the at least the portion of the first video frame and the at least the portion of the second video frame are visually separated. In some examples, the at least the portion of the first video frame and the at least the portion of the second video frame are visually separated by a visual marker. In some examples, the visual marker can include a line, an outline, a box, a highlight, a label, color, shading, and/or a different visual indicia.

In some aspects, the process 700 can include determining that one or more subjects from the plurality of subjects are within a FOV of the first image capture device, and triggering the first image capture device to capture the first video frame. In some examples, the first video frame depicts the one or more subjects.

In some aspects, the process 700 can include tracking the one or more subjects based on one or more video frames captured by the first image capture device; based on the tracking, determining that the one or more subjects are no longer within the FOV of the first image capture device; and based on the determining that the one or more subjects are no longer within the FOV of the first image capture device, determining to stop transmitting video data (e.g., video frames) from the first image capture device to the second endpoint.

In some aspects, the process 700 can include, in response to determining that at least one subject is within a FOV of the second image capture device, obtaining, via the second image capture device, a third video frame depicting the at least one subject; and sending the third video frame to the second endpoint.

Figure 8:
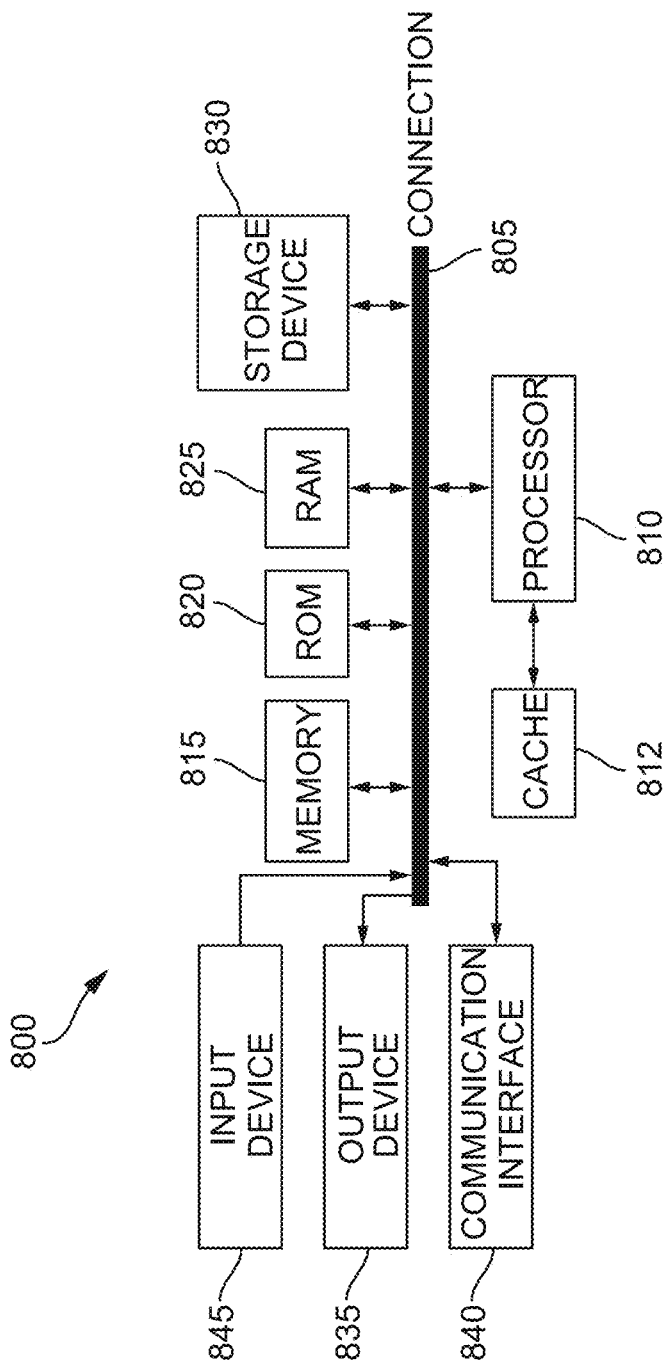
FIG. 8 illustrates an example computing device architecture, in accordance with some examples of the present disclosure.

FIG. 8 illustrates an example computing device architecture 800 of an example computing device which can implement various techniques described herein. For example, the computing device architecture 800 can implement at least some portions of the endpoint 102 shown in FIG. 2. The components of the computing device architecture 800 are shown in electrical communication with each other using a connection 805, such as a bus. The example computing device architecture 800 includes a processing unit (CPU or processor) 810 and a computing device connection 805 that couples various computing device components including the computing device memory 815, such as read only memory (ROM) 820 and random access memory (RAM) 825, to the processor 810.

The computing device architecture 800 can include a cache of high-speed memory connected directly with, in close proximity to, or integrated as part of the processor 810. The computing device architecture 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other computing device memory 815 may be available for use as well. The memory 815 can include multiple different types of memory with different performance characteristics. The processor 810 can include any general-purpose processor and a hardware or software service stored in storage device 830 and configured to control the processor 810 as well as a special-purpose processor where software instructions are incorporated into the processor design. The processor 810 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art, such as a display, projector, television, speaker device. In some instances, multimodal computing devices can enable a user to provide multiple types of input to communicate with the computing device architecture 800. The communication interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can include software, code, firmware, etc., for controlling the processor 810. Other hardware or software modules are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. An apparatus for processing video calls, comprising: a memory; and one or more processors coupled to the memory, the one or more processors being configured to: establish a video call between the apparatus and a remote device; display a preview of a first camera feed and a second camera feed, the first camera feed comprising a first video frame captured by a first image capture device of the apparatus and a second video frame captured by a second image capture device of the apparatus, the first video frame and the second video frame being visually separated within the preview; receive a selection of a set of subjects depicted in the preview; and generate, based on the first camera feed and the second camera feed, a single frame depicting the set of subjects.

Aspect 2. The apparatus of Aspect 1, wherein the first video frame and the second video frame depict a plurality of subjects comprising the set of subjects, and wherein the selection of the set of subjects comprises at least one of a first input selecting the set of subjects as a subset of the plurality of subjects to be included in the single frame and a second input selecting one or more subjects of the plurality of subjects to be excluded from the single frame, the one or more subjects being different than the set of subjects.

Aspect 3. The apparatus of Aspect 2, wherein, to generate the single frame, the one or more processors are further configured to: based on at least one of the first input and the second input, exclude, from the single frame, the one or more subjects of the plurality of subjects; and send the single frame to the remote device.

Aspect 4. The apparatus of Aspect 3, wherein, to exclude the one or more subjects from the single frame, the one or more processors are configured to remove the one or more subjects from at least one of the preview, the first video frame, the second video frame, and the single frame.

Aspect 5. The apparatus of any of Aspects 1 to 4, wherein, to generate the single frame, the one or more processors are configured to: combine at least a portion of the first video frame and at least a portion of the second video frame into the single frame.

Aspect 6. The apparatus of Aspect 5, wherein, to combine at least a portion of the first video frame and at least a portion of the second video frame into the single frame, the one or more processors are configured to: arrange at least the portion of the first video frame and at least the portion of the second video frame into respective frame regions of the single frame, each frame region depicting a respective subject from the set of subjects.

Aspect 7. The apparatus of any of Aspects 1 to 6, wherein the first video frame comprises one or more first subjects from the set of subjects and the second video frame comprises one or more second subjects from the set of subjects, and wherein, to generate the single frame, the one or more processors are further configured to: determine, based on first metadata associated with the first video frame, a respective location of each of the one or more first subjects within the first video frame, the first metadata comprising coordinates associated with the one or more first subjects; determine, based on second metadata associated with the second video frame, a respective location of each of the one or more second subjects within the second video frame, the second metadata comprising coordinates associated with the one or more second subjects; and based on the respective location of each of the one or more first subjects within the first video frame and the respective location of each of the one or more second subjects within the second video frame, determine a first portion of the first video frame depicting the one or more first subjects and a second portion of the second video frame depicting the one or more second subjects.

Aspect 8. The apparatus of Aspect 7, wherein, to generate the single frame, the one or more processors are further configured to: combine the first portion of the first video frame and the second portion of the second video frame into the single frame.

Aspect 9. The apparatus of Aspect 8, wherein, to combine the first portion of the first video frame and the second portion of the second video frame into the single frame, the one or more processors are configured to: place the first portion of the first video frame and the second portion of the second video frame within respective frame regions of the single frame, wherein a first region of the respective frame regions depicts the one or more first subjects and a second region of the respective frame regions depicts the one or more second subjects.

Aspect 10. The apparatus of any of Aspects 1 to 9, wherein, to generate the single frame, the one or more processors are further configured to: render at least a portion of the first video frame and at least a portion of the second video frame within the single frame, wherein the at least the portion of the first video frame and the at least the portion of the second video frame are visually separated.

Aspect 11. The apparatus of Aspect 10, wherein the at least the portion of the first video frame and the at least the portion of the second video frame are visually separated by a visual marker, the visual marker comprising at least one of a line, an outline, a box, a highlight, a label, color, shading, and a visual indicia.

Aspect 12. The apparatus of any of Aspects 1 to 11, wherein the one or more processors are configured to: obtain the first video frame from the first image capture device and the second video frame from the second image capture device.

Aspect 13. The apparatus of Aspect 12, further comprising at least one of the first image capture device and the second image capture device.

Aspect 14. The apparatus of any of Aspects 1 to 13, wherein the one or more processors are configured to: determine that one or more subjects are within a field-of-view (FOV) of the first image capture device; and trigger the first image capture device to capture the first video frame, wherein the first video frame depicts the one or more subjects.

Aspect 15. The apparatus of Aspect 14, wherein the one or more processors are configured to: track the one or more subjects based on one or more video frames captured by the first image capture device; based on the tracking, determine that the one or more subjects are no longer within the FOV of the first image capture device; and based on the determining that the one or more subjects are no longer within the FOV of the first image capture device, determine to stop transmitting video data from the first image capture device to the remote device.

Aspect 16. The apparatus Aspect 15, wherein the one or more processors are configured to: in response to determining that at least one subject is within a FOV of the second image capture device, obtain, via the second image capture device, a third video frame depicting the at least one subject; and send the third video frame to the remote device.

Aspect 17. The apparatus of any of Aspects 1 to 16, wherein the apparatus comprises a mobile device.

Aspect 18. A method for processing video calls, the method comprising: establishing a video call between a device and a remote device; displaying a preview of a first camera feed and a second camera feed, the first camera feed comprising a first video frame captured by a first image capture device of the device and a second video frame captured by a second image capture device of the device, the first video frame and the second video frame being visually separated within the preview; receiving a selection of a set of subjects depicted in the preview; and generating, based on the first camera feed and the second camera feed, a single frame depicting the set of subjects.

Aspect 19. The method of Aspect 18, wherein the first video frame and the second video frame depict a plurality of subjects comprising the set of subjects, and wherein the selection of the set of subjects comprises at least one of a first input selecting the set of subjects as a subset of the plurality of subjects to be included in the single frame and a second input selecting one or more subjects of the plurality of subjects to be excluded from the single frame, the one or more subjects being different than the set of subjects.

Aspect 20. The method of Aspect 19, wherein generating the single frame further comprises: based on at least one of the first input and the second input, excluding, from the single frame, the one or more subjects of the plurality of subjects; and sending the single frame to the remote device.

Aspect 21. The method of Aspect 20, wherein excluding the one or more subjects from the single frame further comprises removing the one or more subjects from at least one of the preview, the first video frame, the second video frame, and the single frame.

Aspect 22. The method of any of Aspects 18 to 21, wherein generating the single frame further comprises: combining at least a portion of the first video frame and at least a portion of the second video frame into the single frame.

Aspect 23. The method of Aspect 22, wherein combining at least a portion of the first video frame and at least a portion of the second video frame into the single frame comprises: arranging at least the portion of the first video frame and at least the portion of the second video frame into respective frame regions of the single frame, each frame region depicting a respective subject from the set of subjects.

Aspect 24. The method of any of Aspects 18 to 23, wherein the first video frame comprises one or more first subjects from the set of subjects and the second video frame comprises one or more second subjects from the set of subjects, and wherein generating the single frame further comprises: determining, based on first metadata associated with the first video frame, a respective location of each of the one or more first subjects within the first video frame, the first metadata comprising coordinates associated with the one or more first subjects; determining, based on second metadata associated with the second video frame, a respective location of each of the one or more second subjects within the second video frame, the second metadata comprising coordinates associated with the one or more second subjects; and based on the respective location of each of the one or more first subjects within the first video frame and the respective location of each of the one or more second subjects within the second video frame, determining a first portion of the first video frame depicting the one or more first subjects and a second portion of the second video frame depicting the one or more second subjects.

Aspect 25. The method of Aspect 24, wherein generating the single frame further comprises: combining the first portion of the first video frame and the second portion of the second video frame into the single frame.

Aspect 26. The method of Aspect 25, wherein combining the first portion of the first video frame and the second portion of the second video frame into the single frame comprises: placing the first portion of the first video frame and the second portion of the second video frame within respective frame regions of the single frame, wherein a first region of the respective frame regions depicts the one or more first subjects and a second region of the respective frame regions depicts the one or more second subjects.

Aspect 27. The method of any of Aspects 18 to 26, wherein generating the single frame further comprises: rendering at least a portion of the first video frame and at least a portion of the second video frame within the single frame, wherein the at least the portion of the first video frame and the at least the portion of the second video frame are visually separated.

Aspect 28. The method of Aspect 27, wherein the at least the portion of the first video frame and the at least the portion of the second video frame are visually separated by a visual marker, the visual marker comprising at least one of a line, an outline, a box, a highlight, a label, color, shading, and a visual indicia.

Aspect 29. The method of any of Aspects 18 to 28, further comprising: obtaining the first video frame from the first image capture device and the second video frame from the second image capture device.

Aspect 30. The method of any of Aspects 18 to 29, further comprising: determining that one or more subjects are within a field-of-view (FOV) of the first image capture device; and triggering the first image capture device to capture the first video frame, wherein the first video frame depicts the one or more subjects.

Aspect 31. The method of Aspect 30, further comprising: tracking the one or more subjects based on one or more video frames captured by the first image capture device; based on the tracking, determining that the one or more subjects are no longer within the FOV of the first image capture device; and based on the determining that the one or more subjects are no longer within the FOV of the first image capture device, determining to stop transmitting video data from the first image capture device to the remote device.

Aspect 32. The method of Aspect 31, further comprising: in response to determining that at least one subject is within a FOV of the second image capture device, obtaining, via the second image capture device, a third video frame depicting the at least one subject; and sending the third video frame to the remote device.

Aspect 33. At least one non-transitory computer-readable medium containing instructions which, when executed by one or more processors, cause the one or more processors to perform a method according to any of Aspects 18 to 32.

Aspect 34. An apparatus comprising means for performing a method according to any of Aspects 18 to 32.

Aspect 34. The apparatus of Aspect 34, wherein the apparatus comprises a mobile device.

What is claimed is:
1. An apparatus, comprising:
one or more processors, the one or more processors being configured to:

generate a first preview of a first camera feed, the first preview including a plurality of subjects within a first field of view (FOV) of a first image capture device;

generate a second preview of a second camera feed, the second preview including a second set of subjects within a second field of view (FOV) of a second image capture device, the second FOV being different than the first FOV;

receive, to determine a first set of selected subjects, an input indicative of a selection of a first set of subjects among the plurality of subjects depicted in the first preview, wherein the first set of selected subjects includes fewer subjects than a number of subjects included in the plurality of subjects within the first FOV, and wherein the first set of selected subjects is different than the second set of subjects; and generate, based on the first camera feed and the second camera feed, a single frame including the second set of subjects and only the first set of selected subjects among the plurality of subjects depicted in the first preview.

2. The apparatus of claim 1, wherein the input indicative of the selection of the first set of subjects comprises at least one of a first input selecting the first set of subjects to be included in the single frame or a second input selecting one or more subjects of the plurality of subjects to be excluded from the single frame.

3. The apparatus of claim 2, wherein, to generate the single frame, the one or more processors are configured to:
based on at least one of the first input or the second input, exclude, from the single frame, the one or more subjects of the plurality of subjects; and
send the single frame to a remote device.

4. The apparatus of claim 1, wherein, to generate the single frame, the one or more processors are configured to:
combine image data of the first camera feed and image data of the second camera feed.

5. The apparatus of claim 4, wherein the one or more processors are configured to:
arrange the image data of the first camera feed and the image data of the second camera feed into respective frame regions of the single frame.

6. The apparatus of claim 1, wherein the one or more processors are further configured to:
render at least a portion of the single frame, wherein the first set of selected subjects and the second set of subjects are visually separated.

7. The apparatus of claim 6, wherein the first set of selected subjects and the second set of subjects are visually separated by a visual marker, the visual marker comprising at least one of a line, an outline, a box, a highlight, a label, color, shading, or a visual indicia.

8. The apparatus of claim 1, further comprising:
the first image capture device having the first FOV, the first image capture device configured to capture video frames associated with the first camera feed; and
the second image capture device having the second FOV, the second image capture device configured to capture video frames associated with the second camera feed.

9. The apparatus of claim 1, further comprising a user input reception device coupled to the one or more processors, wherein the one or more processors are configured to receive the input indicative of the selection of the first set of subjects via the user input reception device.

10. The apparatus of claim 1, wherein the apparatus comprises a mobile device.

11. A method for processing video calls at a computing device, the method comprising:
generating a first preview of a first camera feed, the first preview including a plurality of subjects within a first field of view (FOV) of a first image capture device;
generating a second preview of a second camera feed, the second preview including a second set of subjects within a second field of view (FOV) of a second image capture device, the second FOV being different than the first FOV;
receiving, to determine a first set of selected subjects, an input indicative of a selection of a first set of subjects among the plurality of subjects depicted in the first preview, wherein the first set of selected subjects includes fewer subjects than a number of subjects included in the plurality of subjects within the first FOV, and wherein the first set of selected subjects is different than the second set of subjects; and
generating, based on the first camera feed and the second camera feed, a single frame including the second set of subjects and only the first set of selected subjects among the plurality of subjects depicted in the first preview.

12. The method of claim 11, wherein the input indicative of the selection of the first set of subjects comprises at least one of a first input selecting the first set of subjects to be included in the single frame or a second input selecting one or more subjects of the plurality of subjects to be excluded from the single frame.

13. The method of claim 12, wherein generating the single frame comprises:
based on at least one of the first input or the second input, excluding, from the single frame, the one or more subjects of the plurality of subjects; and
sending the single frame to a remote device.

14. The method of claim 11, wherein generating the single frame comprises:
combining image data of the first camera feed and image data of the second camera feed.

15. The method of claim 14, further comprising:
arranging the image data of the first camera feed and the image data of the second camera feed into respective frame regions of the single frame.

16. The method of claim 11, further comprising:
rendering at least a portion of the single frame, wherein the first set of selected subjects and the second set of subjects are visually separated.

17. The method of claim 16, wherein the first set of selected subjects and the second set of subjects are visually separated by a visual marker, the visual marker comprising at least one of a line, an outline, a box, a highlight, a label, color, shading, or a visual indicia.

18. The method of claim 11, wherein the first image capture device is configured to capture video frames associated with the first camera feed, and wherein the second image capture device is configured to capture video frames associated with the second camera feed.

19. The method of claim 11, further comprising receiving the input indicative of the selection of the first set of subjects via a user input reception device.

20. The method of claim 11, wherein the computing device comprises a mobile device.

* * * * *